(12) United States Patent
Kato

(10) Patent No.: US 10,599,970 B2
(45) Date of Patent: Mar. 24, 2020

(54) RFID TAG AND RFID TAG MANAGEMENT METHOD

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 90 days.

(21) Appl. No.: 16/182,806

(22) Filed: Nov. 7, 2018

(65) Prior Publication Data

US 2019/0073579 A1  Mar. 7, 2019

Related U.S. Application Data

(63) Continuation of application No. PCT/JP2018/015364, filed on Apr. 12, 2018.

(30) Foreign Application Priority Data

Jul. 14, 2017  (JP) .................................. 2017-137972

(51) Int. Cl.
*G06K 19/06* (2006.01)
*G06K 19/077* (2006.01)
(Continued)

(52) U.S. Cl.
CPC ... *G06K 19/07758* (2013.01); *G06K 19/0775* (2013.01); *G06K 19/07722* (2013.01);
(Continued)

(58) Field of Classification Search
CPC ............ G06K 19/07749; G07F 7/1008; G06Q 20/341
(Continued)

(56) References Cited

U.S. PATENT DOCUMENTS 7,548,167 B2   6/2009  Yamagajo et al.
8,613,395 B2 * 12/2013  Kimura ............ G06K 19/07767
                                                                235/492

(Continued)

FOREIGN PATENT DOCUMENTS

JP     2010258731 A   11/2010
JP       5904316 B1    4/2016
(Continued)

OTHER PUBLICATIONS

International Search Report issued for PCT/JP2018/015364 dated May 22, 2018.
(Continued)

*Primary Examiner* — Ahshik Kim
(74) *Attorney, Agent, or Firm* — Arent Fox LLP

(57) ABSTRACT

An RFID tag includes a base material, an RFIC element, and a dipole antenna. The base material has a first end, a second end, a first side, and a second side. The RFIC element is mounted on the base material and includes a first input and output terminal and a second input and output terminal. The dipole antenna includes a first dipole element and a second dipole element. The first dipole element is a conductor pattern that extends from a first connection end toward the first end and meanders toward the first side, and the second dipole element is a conductor pattern that extends from a second connection end toward the second end and meanders toward the second side.

20 Claims, 26 Drawing Sheets

(51) Int. Cl.
*H01Q 1/22* (2006.01)
*H01Q 9/26* (2006.01)

(52) U.S. Cl.
CPC . *G06K 19/07749* (2013.01); *G06K 19/07773* (2013.01); *G06K 19/07783* (2013.01); *H01Q 1/2225* (2013.01); *H01Q 9/26* (2013.01)

(58) Field of Classification Search
USPC .......................................................... 235/492
See application file for complete search history.

(56) References Cited

U.S. PATENT DOCUMENTS

| | | | |
|---|---|---|---|
| 8,991,713 B2* | 3/2015 | Dokai | G06K 19/07786 235/486 |
| 9,317,800 B2 | 4/2016 | Omura et al. | |
| 9,836,686 B2 | 12/2017 | Kato et al. | |
| 9,882,283 B2 | 1/2018 | Kawata | |
| 2006/0208900 A1* | 9/2006 | Tavassoli Hozouri | G06K 19/07749 340/572.7 |
| 2008/0111695 A1 | 5/2008 | Yamagajo et al. | |
| 2009/0160717 A1* | 6/2009 | Tsutsumi | H01Q 9/16 343/726 |
| 2013/0140371 A1 | 6/2013 | Omura et al. | |
| 2014/0361089 A1* | 12/2014 | Kai | H01Q 1/38 235/492 |
| 2015/0162664 A1 | 6/2015 | Kawata | |
| 2016/0350638 A1 | 12/2016 | Kato et al. | |
| 2018/0060717 A1 | 3/2018 | Kato et al. | |

FOREIGN PATENT DOCUMENTS

| | | |
|---|---|---|
| WO | 2007013168 A1 | 2/2007 |
| WO | 2012023511 A1 | 2/2012 |
| WO | 2013187509 A1 | 12/2013 |
| WO | 2016072335 A1 | 5/2016 |

OTHER PUBLICATIONS

Written Opinion of the International Searching Authority issued for PCT/JP2018/015364 dated May 22, 2018.

* cited by examiner

Fig. 22A    COMPARATIVE EXAMPLE
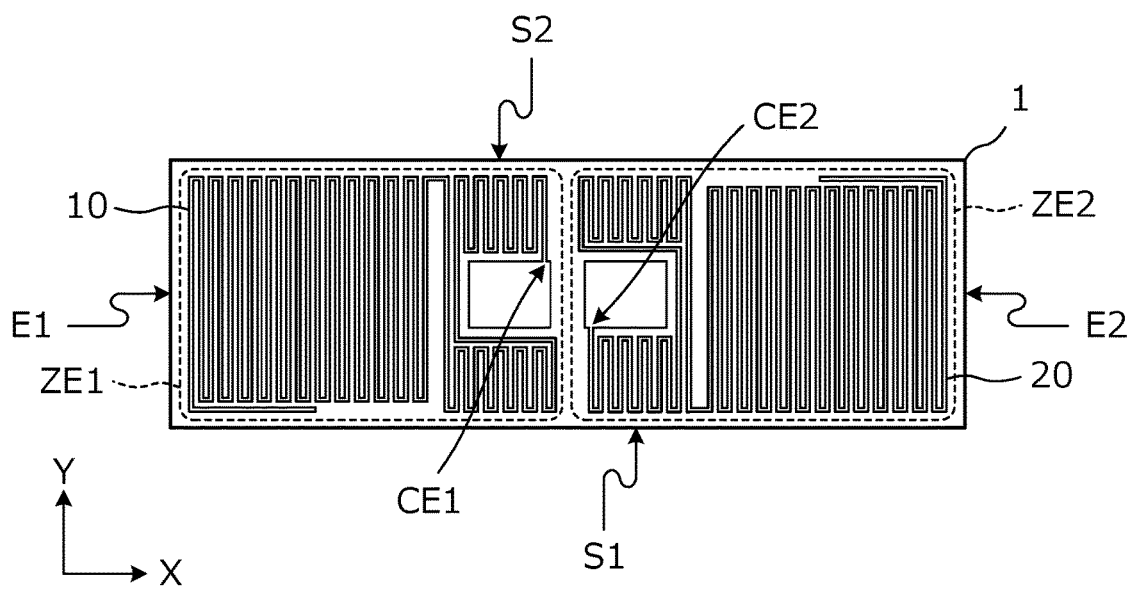
Fig. 22B
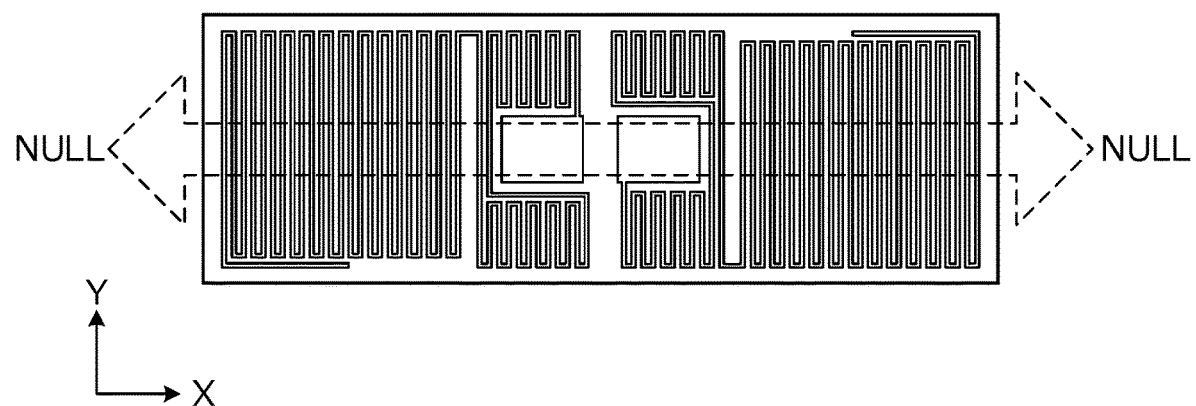

RFID TAG AND RFID TAG MANAGEMENT METHOD

CROSS REFERENCE TO RELATED APPLICATIONS

The present application is a continuation of PCT/JP2018/015364 filed Apr. 12, 2018, which claims priority to Japanese Patent Application No. 2017-137972, filed Jul. 14, 2017, the entire contents of each of which are incorporated herein by reference.

TECHNICAL FIELD

The present disclosure relates to an RFID (Radio Frequency IDentification) tag to be attached to an article, and, more particularly, to an RFID tag including a dipole antenna and an RFID tag management method using such an RFID tag.

BACKGROUND

Patent Literature 1 (identified below) discloses an RFID tag in which an RFIC (Radio Frequency Integrated Circuit) element is mounted on a base material including a conductor pattern functioning as a dipole antenna. This RFID tag is attached to an article for the sake of logistics, for example, and reading and writing is performed by a reader/writer when necessary.

The dipole antenna includes two dipole elements to be connected to two connection ends of an RFIC element. Therefore, a null point, at which gain is zero, occurs in a direction in which the two dipole elements extend from the two connection ends of the RFIC element to respective open ends. A reader/writer is not able to communicate in a direction of this null point.

Patent Literature 1: Japanese Patent No. 5904316.

The presence of the above described null point usually does not cause a problem since the direction of a reader/writer is flexible with respect to an RFID tag when the RFID tag is used in order to manage a certain article. In other words, when communication is not able to be established at a distance within which communication with the RFID tag must be enabled, a null point is able to be avoided only by slightly changing the direction of a reader/writer with respect to the RFID tag, so that communication is enabled.

However, when a position at which the RFID tag is able to be attached to an article is limited, or when the direction of a reader/writer to an article (with respect to an RFID tag) is limited, the above-stated null point may cause a serious problem. In other words, when the RFID tag is attached to an article at the only attachable position in the only attachable direction, and a reader/writer is held over the article in the only possible direction, communication is not established and the RFID tag is not able to be used practically.

SUMMARY OF THE INVENTION

In view of the foregoing, an RFID tag and an RFID tag management method are disclosed that avoids a situation in which a null point makes communication impossible as described above according to the existing art.

Specifically, an RFID tag according to an exemplary embodiment includes a base material, an RFIC element mounted on the base material and including a first input and output terminal and a second input and output terminal, and a dipole antenna disposed on the base material. Moreover, the dipole antenna includes a first dipole element including a first connection end to be connected to the first input and output terminal, at one end, and a first open end at another end, and a second dipole element including a second connection end to be connected to the second input and output terminal, at one end, and a second open end at another end. Moreover, a region in which the dipole antenna is provided extends in a longitudinal direction and a transverse direction in a plan view and includes a first end and a second end, which are end portions that face each other in the longitudinal direction, and a first side portion and a second side portion being side portions that face each other in the transverse direction. In addition, the first dipole element is a conductor pattern that extends from the first connection end toward the first end and meanders toward the first side portion; and the second dipole element is a conductor pattern that extends from the second connection end toward the second end and meanders toward the second side portion.

According to the above-described configuration, the null point of the dipole antenna is inclined (rotated), from the longitudinal direction of the region in which the dipole antenna is provided, in the in-plane direction of the region in which the dipole antenna is provided, so that a reader/writer is able to be held in a direction shifted from the null point, which makes it possible to avoid a situation in which the null point makes communication impossible.

In an exemplary aspect, the first open end may preferably be located at a position adjacent to the first side portion in a region in which the first dipole element is provided, and the second open end may preferably be located at a position adjacent to the second side portion in a region in which the second dipole element is provided. According to this structure, the gradient of the null point from the longitudinal direction of the region in which the dipole antenna is provided is able to be increased.

Moreover, the first open end of the first dipole element may preferably be bent back from the first end toward the second end, and the second open end of the second dipole element may preferably be bent back from the second end toward the first end. According to this structure, the gradient of the null point from the longitudinal direction of the region in which the dipole antenna is provided is able to be increased effectively.

The RFIC element may preferably be an element in which an RFIC chip and an impedance matching circuit are integrated, the impedance matching circuit matching impedance between the RFIC chip and the dipole antenna. According to this configuration, the electrical characteristics of the RFID tag are not affected by the dielectric permittivity or magnetic permeability of an article being a target article on which an RFID tag is provided by means of attaching or the like, and the electrical characteristics of the RFID tag alone are able to be maintained.

The RFIC element may preferably be located at the center of the region in which the dipole antenna is provided. According to this structure, the 180-degree rotational symmetry of the dipole type antenna by the first dipole element and the second dipole element is able to be satisfied, so that the characteristics of a high-gain dipole antenna are able to be maintained.

Yet further, a portion of the first dipole element may preferably be disposed between the RFIC element and the first side portion, and a portion of the second dipole element may preferably be disposed between the RFIC element and the second side portion. According to this structure, the first dipole element and second dipole element having a predetermined line length are able to be provided in a base material having a limited area.

For example, the dipole antenna may have a length in the longitudinal direction more than twice longer than a length in the transverse direction. According to this structure, the range of the first dipole element and the second dipole element that extend from the RFIC element in directions substantially opposite to each other is able to be kept long, so that a predetermined gain of the dipole antenna is easily obtained.

The RFIC element may preferably communicate in the UHF band through the dipole antenna. As a result, the RFIC element is able to be adapted to the RFID system that uses the UHF band.

According to another exemplary embodiment, an RFID tag management method is disclosed for an RFID tag to manage by an RFID tag an article housed in a housing at which a communication direction in which a reader/writer is directed is one way. The method comprises attaching the RFID tag according to an exemplary embodiment to a surface among outer surfaces of the article, the surface being able to be attached with the RFID tag and being away from a metal member in the housing, and communicating with the RFID tag by directing the reader/writer in the communication direction.

According to this configuration, even when a position at which the RFID tag is able to be attached to an article is limited, or when the direction of a reader/writer to an article (with respect to an RFID tag) is limited, the article is able to be managed by the RFID tag.

According to the exemplary embodiments, even when the RFID tag is attached to an article in a position and direction that are restricted with respect to an article, and a reader/writer has to be held over the article in a direction that is restricted with respect to the article, the situation in which a null point makes communication impossible is avoided. In addition, even when a position at which the RFID tag is able to be attached to an article is limited, or when the direction of a reader/writer to an article is limited, the article is able to be managed by the RFID tag.

BRIEF DESCRIPTION OF THE DRAWINGS

FIG. 22A is a plan view of an RFID tag according to a comparative example. FIG. 22B is a diagram illustrating a direction of a null point of the RFID tag according to the comparative example.

DETAILED DESCRIPTION

Figure 1A:
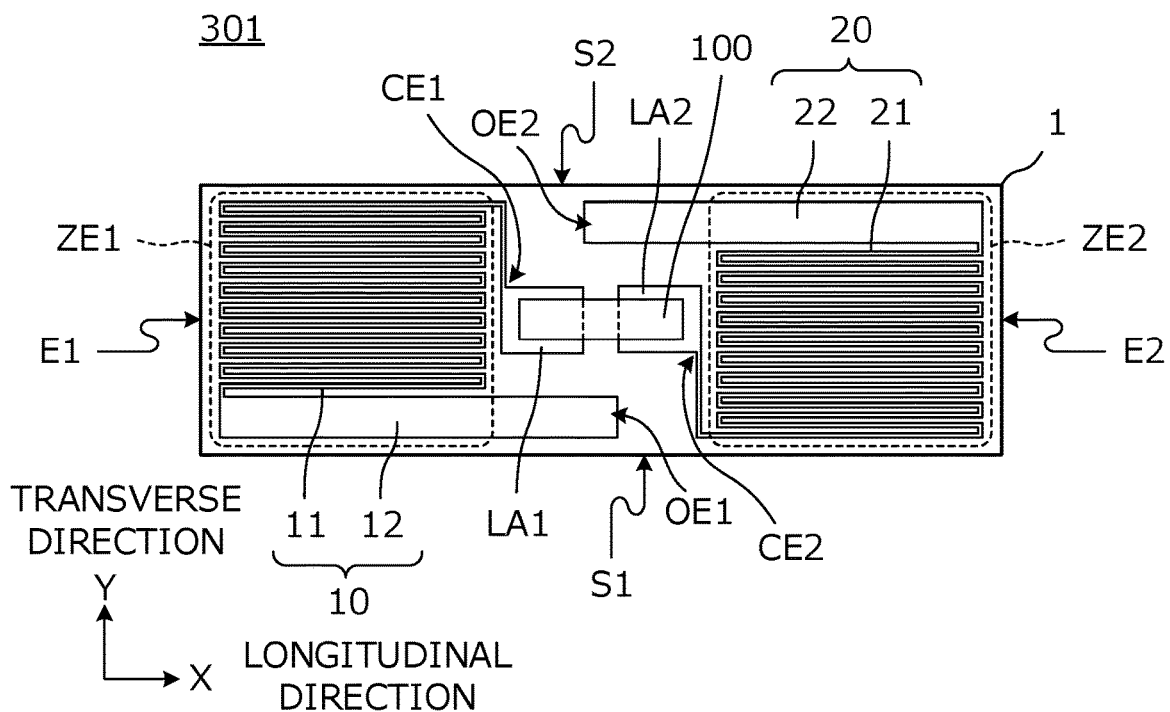
FIG. 1A is a plan view of an RFID tag 301 according to a first exemplary embodiment.

Hereinafter, a plurality of exemplary embodiments of the present disclosure will be described with reference to the attached drawings and several specific examples. In the drawings, the same components and elements are denoted by the same reference signs. While exemplary embodiments are divided and described for the sake of convenience in consideration of easiness of description or understanding of main points, constituent elements described in different embodiments are able to be partially replaced and combined with each other. In the second and subsequent exemplary embodiments, a description of features common to the first exemplary embodiment will be omitted, and different features are primarily described. In particular, a description of similar operational effects achieved by similar structures will not be repeated in each exemplary embodiment.

First Exemplary Embodiment

Figure 1B:
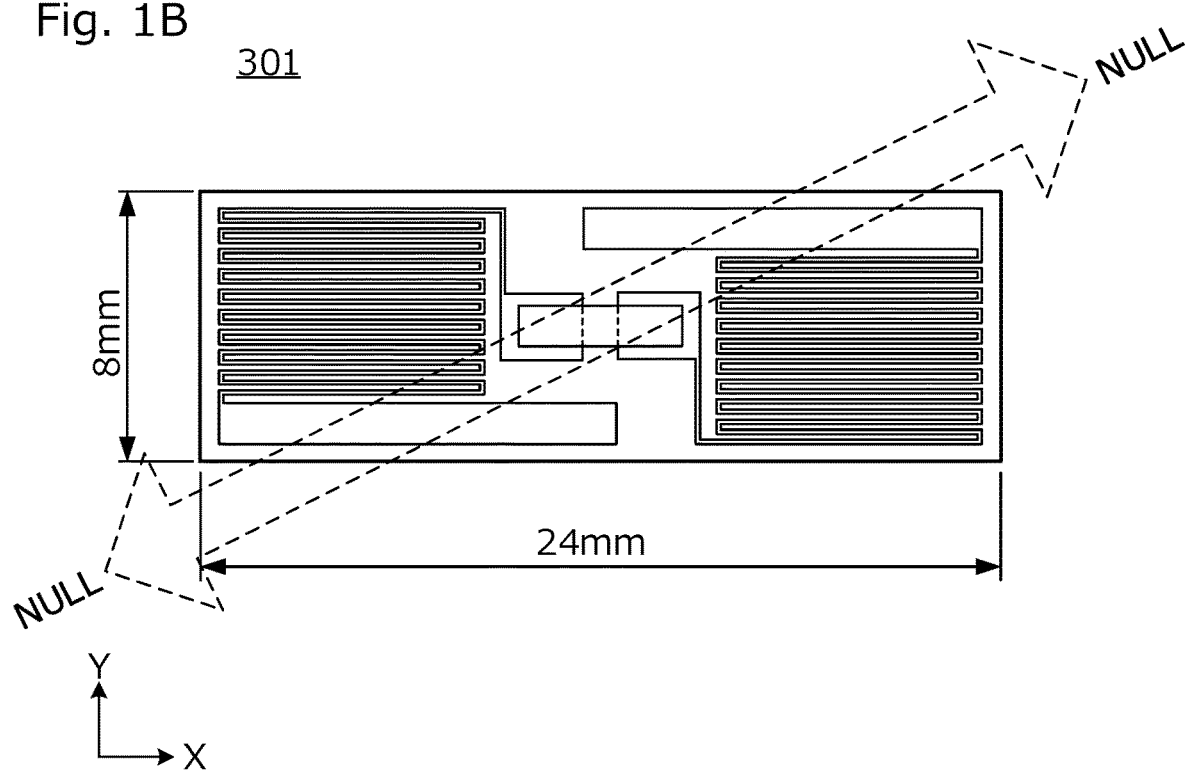
FIG. 1B is a diagram illustrating a direction of a null point of the RFID tag 301.

FIG. 1A is a plan view of an RFID tag 301 according to a first exemplary embodiment. FIG. 1B is a diagram illustrating a direction of a null point of the RFID tag 301.

The RFID tag 301 of the first exemplary embodiment includes a rectangular plate-shaped base material 1, a first dipole element 10 and a second dipole element 20 that are provided on the base material 1, and an RFIC element 100 mounted on the base material 1.

As shown, the base material 1 extends in a longitudinal direction (the X-axis direction in FIG. 1A) and a transverse direction (the Y-axis direction in FIG. 1A) in a plan view, and includes a first end portion E1 (i.e., a first end or a first short side) and a second end portion E2 (i.e., a second end or a second short side) being opposing ends that face each other in the longitudinal direction, and a first side portion S1 (i.e., a first side or first long side) and a second side portion S2 (i.e., a second side or second long side) being opposing sides that face each other in the transverse direction. Since substantially the entire area of the base material is a region in which a dipole antenna is provided, in the first exemplary embodiment, the "longitudinal direction," the "transverse direction," the "first end portion E1," the "second end portion E2," the "first side portion S1," and the "second side portion S2" of the base material 1 respectively correspond to the "longitudinal direction," the "transverse direction," the "first end portion," the "second end portion," the "first side portion," and the "second side portion" according to the exemplary embodiment.

At the center of the base material 1, lands LA1 and LA2 are provided to mount the RFIC element 100. The lands LA1 and LA2 are respectively connected to a first input and output terminal and a second input and output terminal of the RFIC element 100.

The base material 1 includes the first dipole element 10 and the second dipole element 20. The first dipole element 10 and the second dipole element 20 form a single dipole antenna according to the exemplary embodiment.

Moreover, the first dipole element 10 includes a main conductor pattern portion 11 and a tip portion 12 (i.e., a first tip). The second dipole element 20 includes a main conductor pattern portion 21 and a tip portion 22 (i.e., a second tip).

One end of the first dipole element 10 forms a first connection end CE1 to be connected (to be connected to the first input and output terminal of the RFIC element) to the land LA1. The other end of the first dipole element 10 is a first open end OE1. One end of the second dipole element 20 forms a second connection end CE2 to be connected (to be connected to the second input and output terminal of the RFIC element) to the land LA2. The other end of the second dipole element 20 is a second open end OE2.

The first dipole element 10 is a conductor pattern that extends from the first connection end CE1 toward the first end portion E1 and meanders (i.e., extends back and forth in the longitudinal direction) toward the first side portion S1. Similarly, the second dipole element 20 is a conductor pattern that extends from the second connection end CE2 toward the second end portion E2 and meanders (i.e., extends back and forth in the longitudinal direction) toward the second side portion S2.

According to the exemplary embodiment, the first open end OE1 is located at a position adjacent to the first side portion S1 in a region in which the first dipole element 10 is provided. Similarly, the second open end OE2 is located at a position adjacent to the second side portion S2 in a region in which the second dipole element 20 is provided.

The first open end OE1 of the first dipole element 10 is bent back from the first end portion E1 of the base material 1 toward the second end portion E2 of the base material 1. Similarly, the second open end OE2 of the second dipole element 20 is bent back from the second end portion E2 of the base material 1 toward the first end portion E1 of the base material 1.

In an exemplary aspect of the first exemplary embodiment, the line width (in the transverse direction) of the tip portion 12 of the first dipole element 10 is more than twice larger than the line width of the main conductor pattern portion 11 of the first dipole elements 10. Similarly, the line width (in the transverse direction) of the tip portion 22 of the second dipole element 20 is more than twice larger than the line width of the main conductor pattern portion 21 of the second dipole element 20. In addition, while the range in which the main conductor pattern portion 11 is provided in the longitudinal direction extends from the first connection end CE1 to the first end portion E1, the tip portion 12 further extends to a position closer to the second end portion E2 than the first connection end CE1. Similarly, while the range in which the main conductor pattern portion 21 is provided in the longitudinal direction extends from the second connection end CE2 to the second end portion E2, the tip portion 22 further extends to a position closer to the first end portion E1 than the second connection end CE2.

The tip portion 12 of the first dipole element 10 and the tip portion 22 of the second dipole element 20 are conductor patterns configured to add capacitance to the open end and the vicinity of the open end of the dipole element. The addition of capacitance shortens the dipole element.

The RFID tag according to the first exemplary embodiment has a length of 24 mm in the longitudinal direction and a length of 8 mm in the transverse direction, and the ratio of the length in the transverse direction and the longitudinal direction is 1:3. In other words, the length in the longitudinal direction is more than twice the length in the transverse direction (see FIG. 1B).

Figure 19:
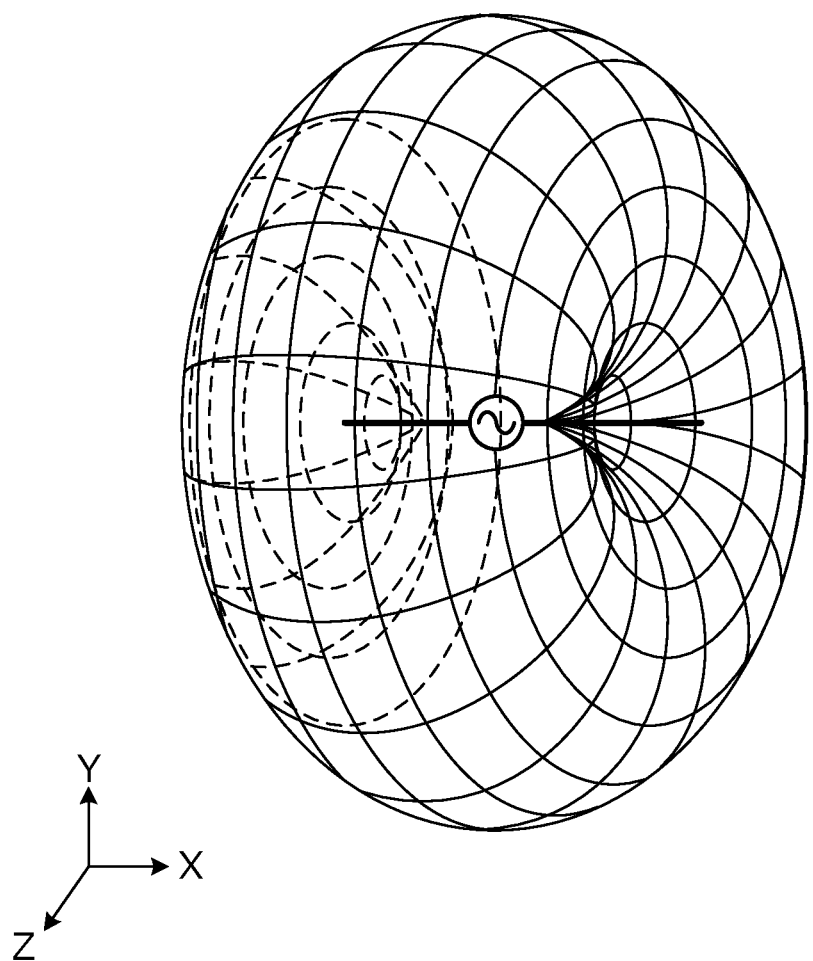
FIG. 19 is a diagram illustrating directivity of a typical dipole type antenna.
Figure 20:
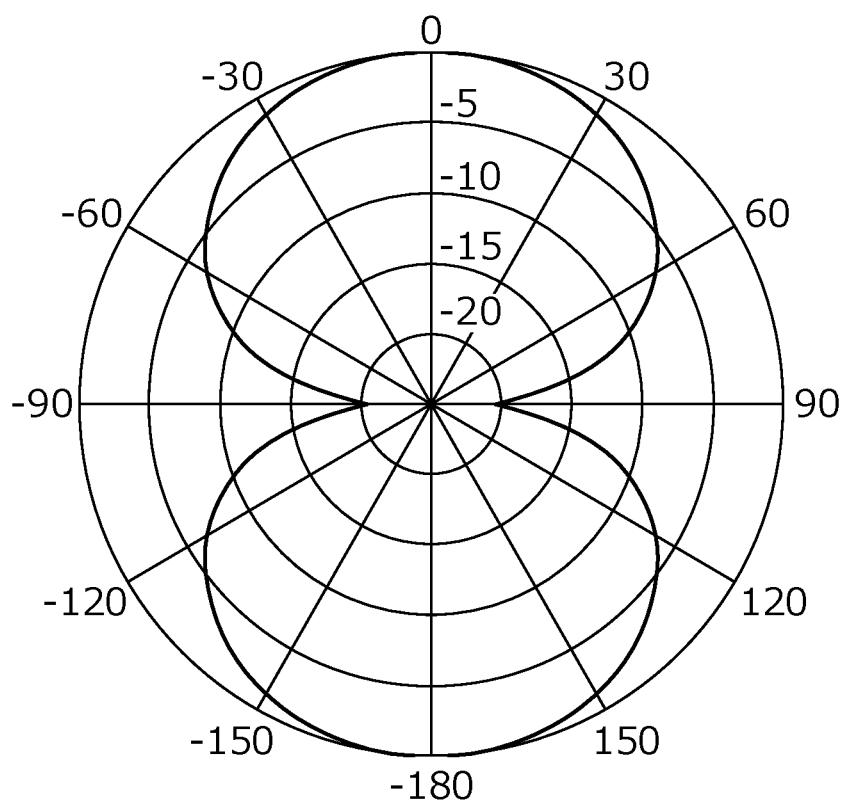
FIG. 20 is a diagram illustrating directivity in a plane (the E-plane) that includes the X-axis of the dipole antenna in FIG. 19.
Figure 21A:
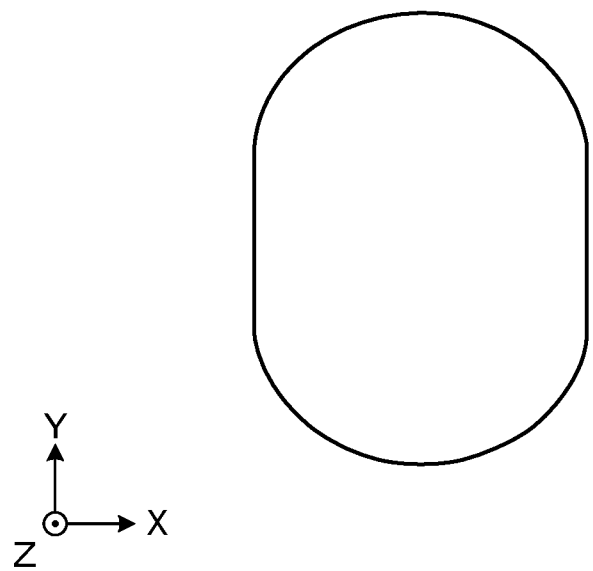
FIG. 21A is an outline of a directivity pattern as viewed in the Z-axis direction.
Figure 21B:
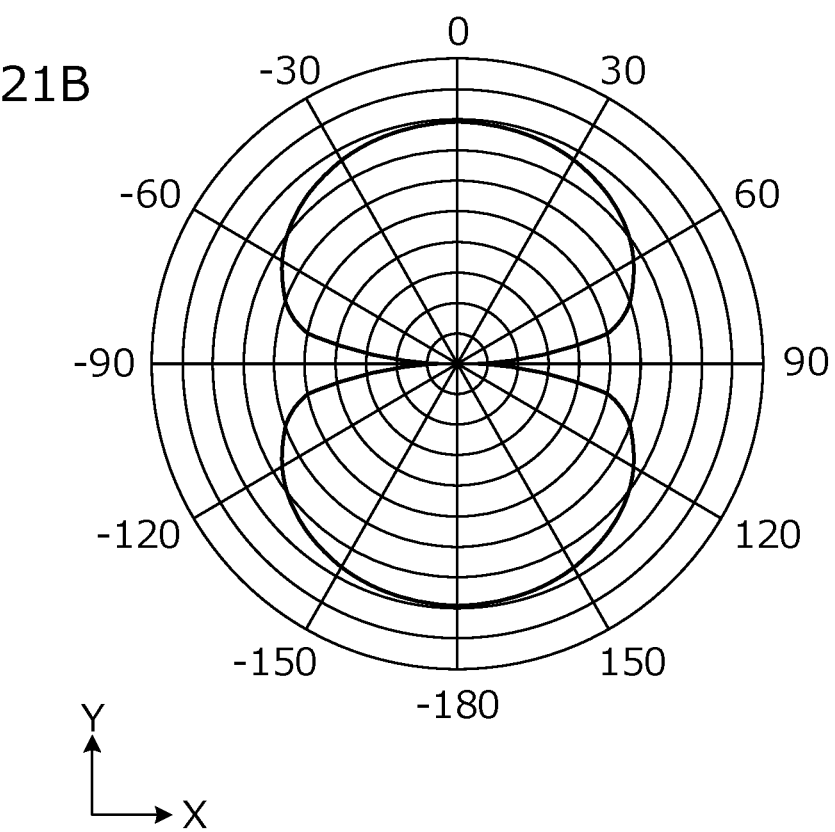
FIG. 21B is a diagram illustrating the directivity in the X-Y plane.

FIG. 19 is a diagram illustrating directivity of a typical dipole type antenna. The dipole element is disposed in the X-axis direction. FIG. 20 is a diagram illustrating directivity in a plane (the E-plane) that includes the X-axis of the dipole antenna in FIG. 19. FIG. 21A is an outline of a directivity pattern as viewed in the Z-axis direction. FIG. 21B is a diagram illustrating the directivity in the X-Y plane.

A typical dipole antenna is used at half wavelength resonance, in which the voltage is maximum at both ends and the current is maximum at the center. Therefore, the directivity in the E-plane (an electric field vibration plane) has the shape of a figure eight as shown in FIG. 20 and FIG. 21B. Then, the X-axis direction being the direction of the symmetry axis of voltage distribution is a null point.

An RFID tag of a comparative example is illustrated in FIG. 22A and FIG. 22B. The first dipole element 10 of the RFID tag of the comparative example is a conductor pattern that meanders from the first connection end CE1 toward the first end portion E1. In addition, the second dipole element 20 is a conductor pattern that meanders from the second connection end CE2 toward the second end portion E2. When the region in which the first dipole element 10 is provided, from the first connection end CE1 to the first end portion E1 is indicated by ZE1, and the region in which the second dipole element 20 is provided, from the second connection end CE2 to the second end portion E2 is indicated by ZE2, the line that connects the center of gravity of the voltage distribution in the region ZE1 and the center of gravity of the voltage distribution in the region ZE2 substantially coincides with a null point. In this comparative example, a null point coincides with the X-axis direction.

Referring back to FIG. 1A, the voltage strength distribution of the tip portion 12 of the entire first dipole element 10 is relatively large. Similarly, the voltage strength distribution of the tip portion 22 of the entire second dipole element 20 is relatively large. Therefore, the line that connects the center of gravity of the voltage distribution in the region ZE1 and the center of gravity of the voltage distribution in the region ZE2 is inclined from the X-axis. The thick arrow indicated by NULL-NULL in FIG. 1B represents a null point. As described above, a null point is inclined from the X-axis.

Figure 2A:
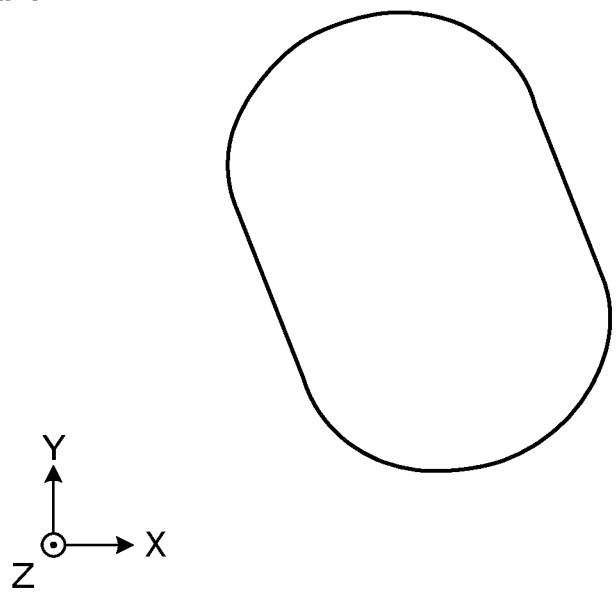
FIG. 2A is an outline view of a directivity pattern as viewed in the Z-axis direction, in the RFID tag of the first exemplary embodiment.
Figure 2B:
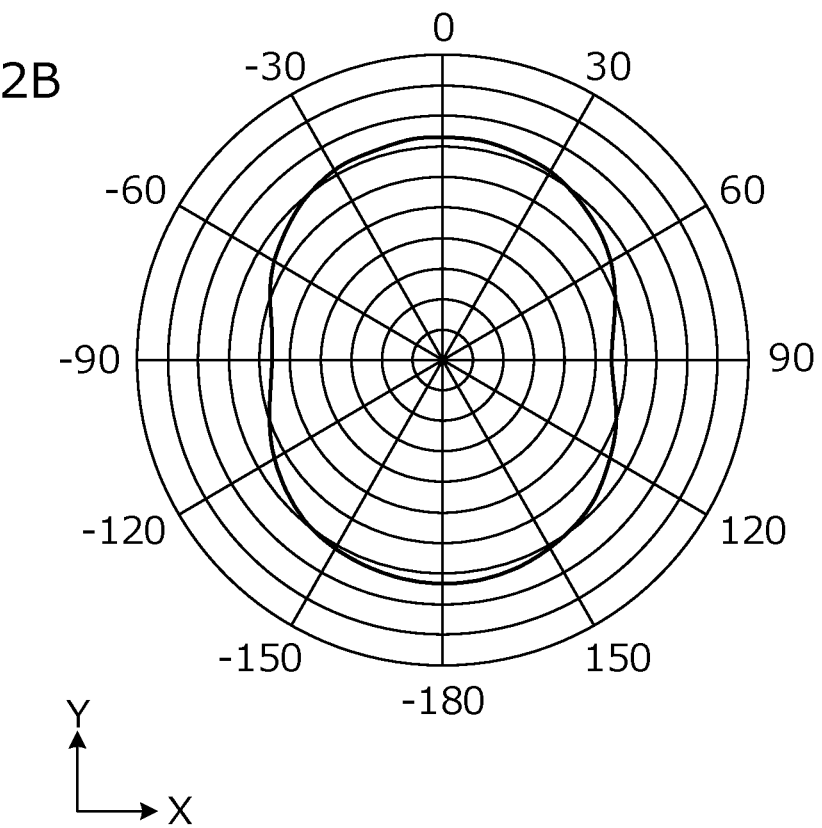
FIG. 2B is a diagram illustrating the directivity in the X-Y plane.

FIG. 2A is an outline view of a directivity pattern as viewed in the Z-axis direction, in the RFID tag of the first exemplary embodiment. FIG. 2B is a diagram illustrating the directivity in the X-Y plane.

In particular, in the first exemplary embodiment, with the tip portions 12 and 22 that have the effect of adding capacitance, regions of high voltage strength of the entire first dipole element 10 are concentrated in the tip portion 12, and regions of high voltage strength of the entire second dipole element 20 are concentrated in the tip portion 22. Accordingly, the line that connects the center of gravity of the voltage distribution in the region ZE1 and the center of gravity of the voltage distribution in the region ZE2 is effectively inclined from the X-axis.

As described above, in FIG. 1B, since the X-axis direction is not null, when a reader/writer is held in the X-axis direction, communication is able to be performed.

Figure 3:
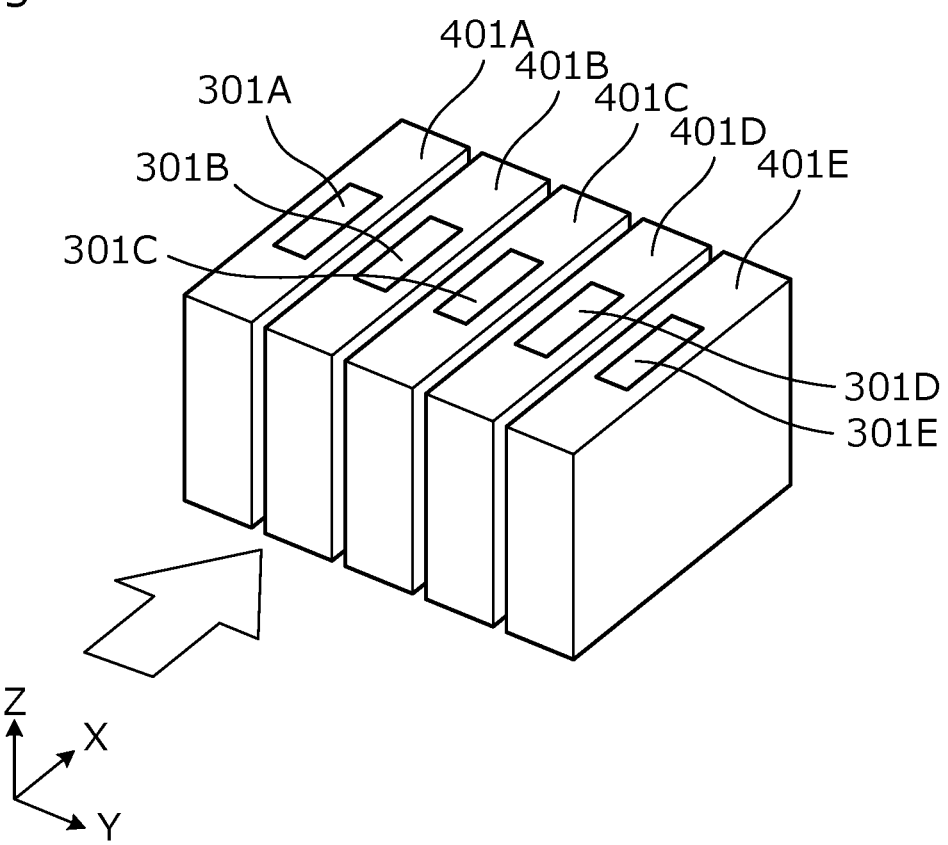
FIG. 3 is a view illustrating a positional relationship of the RFID tag according to the first exemplary embodiment, an article including such a tag, and a reader/writer.

FIG. 3 is a view illustrating a positional relationship of the RFID tag according to the first exemplary embodiment, an article including such a tag, and a reader/writer. Articles 401A to 401E are ink cartridges of an ink-jet printer, for example. These ink cartridges have an approximately rectangular parallelepiped shape, and are respectively attached with RFID tags 301A to 301E on the top shown in FIG. 3. In a case of communicating with the RFID tags when these ink cartridges are installed in the housing of the ink-jet printer, the RFID tags may be unable to be attached to surfaces other than the surface shown in FIG. 3 due to a structure of the ink cartridge and a structure of mounting the ink cartridge to the main body of the ink-jet printer, in some cases for example.

In an example, of six surfaces being the outer surfaces of each of the ink cartridges, the surface on which electrical connection is performed or the surface on which an ink supply port is provided, in the housing of the ink-jet printer, have no space to attach an RFID tag. In addition, among the surfaces other than the surfaces described above, an RFID tag is also unable to be attached to a surface in the vicinity of a metal member in the housing of the ink-jet printer. The reason is that the metal member blocks RFID tag communication. Due to such circumstances, a surface to which an RFID tag is able to be attached is limited. In addition, due to a structure of the housing of an ink-jet printer, a direction in which a reader/writer is directed with respect to the ink-jet printer may also be limited.

In FIG. 3, even when a reader/writer is approached from the direction (in the X-axis direction) indicated by the thick arrow, as described above, this X-axis direction is not null, so that RFID communication is able to be performed. As a result, it becomes possible to manage an ink cartridge and an ink-jet printer through an RFID tag.

Hereinafter, a description will be made of a configuration and effect of an RFIC element.

Figure 4:
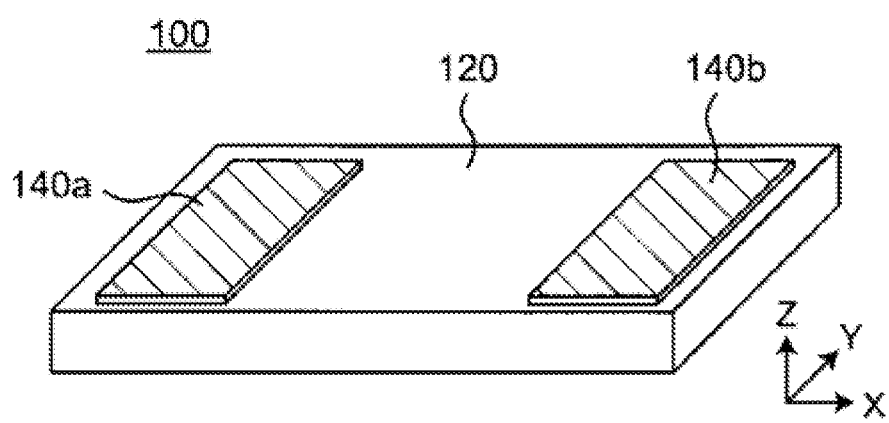
FIG. 4 is a perspective view of an RFIC element 100.

FIG. 4 is a perspective view of an RFIC element 100. The RFIC element 100 preferably is an RFIC element corresponding to a communication frequency of, for example, the 900 MHz band, that is, the UHF band. The RFIC element 100 includes a multilayer substrate 120 of which the principal surface defines a rectangle. The multilayer substrate 120 has flexibility. The multilayer substrate 120, for example, has a structure of a stacked body obtained by stacking flexible resin insulating layers of polyimide, liquid crystal polymer, and the like. Each of the insulating layers made of these materials has permittivity smaller than the permittivity of a ceramic base material layer represented by LTCC.

Hereinafter, a longitudinal direction of the multilayer substrate 120 is indicated by an X-axis, a width direction of the multilayer substrate 120 is indicated by a Y-axis, and a thickness direction of the multilayer substrate 120 is indicated by a Z-axis.

Figure 5:
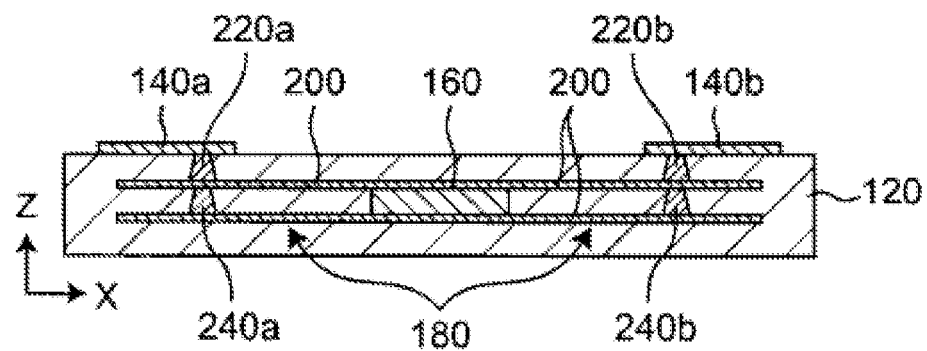
FIG. 5 is a transverse cross-sectional view of the RFIC element shown in FIG. 4.
Figure 6A:
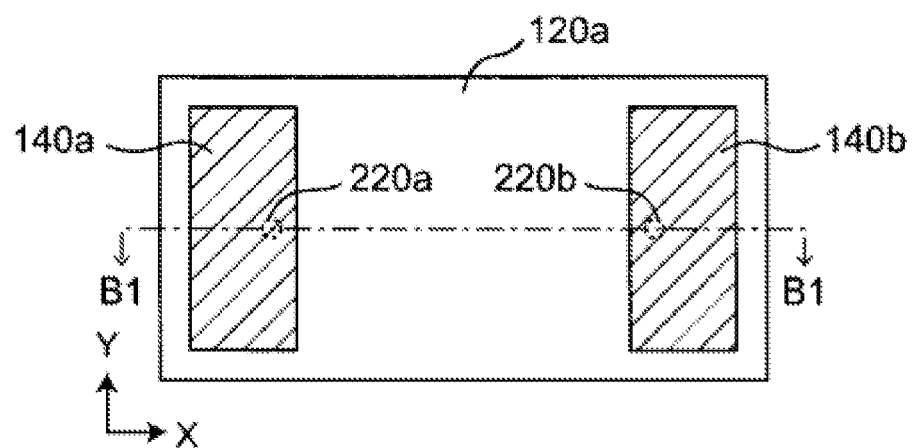
FIG. 6A is a plan view of an upper insulating layer of a multilayer substrate 120 as viewed from directly above.
Figure 6B:
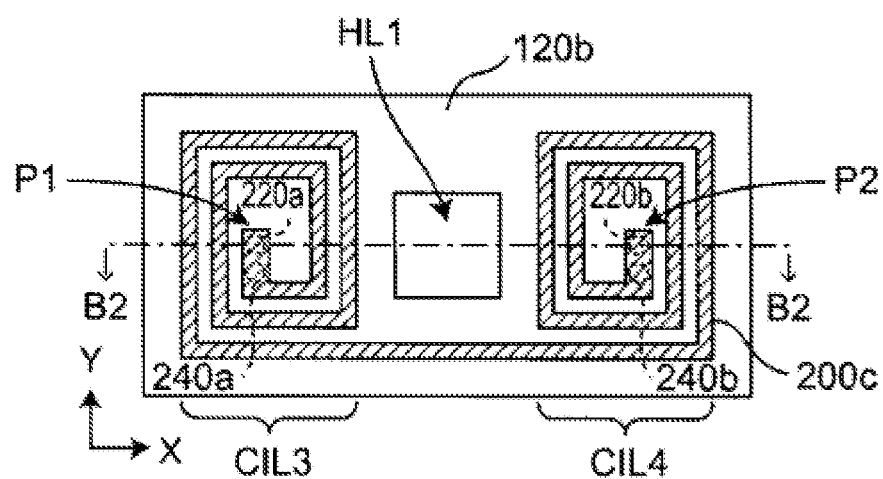
FIG. 6B is a plan view of an intermediate insulating layer of the multilayer substrate 120.
Figure 6C:
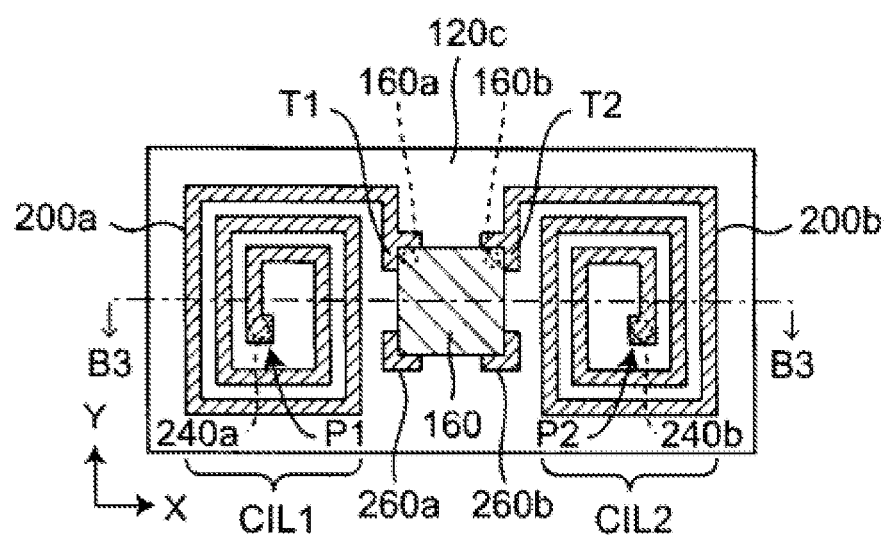
FIG. 6C is a plan view of a lower insulating layer of the multilayer substrate 120.
Figure 7A:
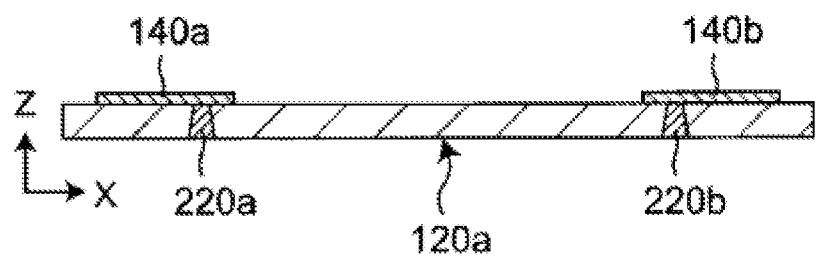
FIG. 7A is a cross-sectional view of the insulating layer shown in FIG. 6A taken along a line B1-B1.
Figure 7B:
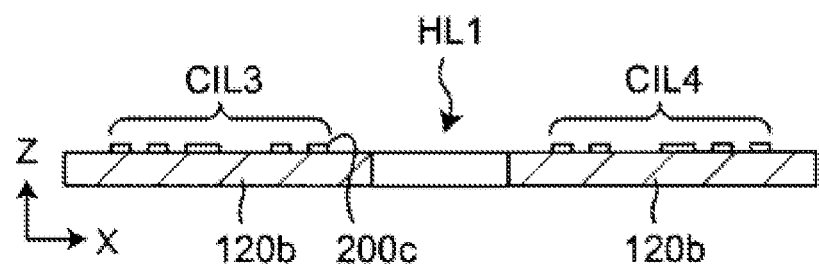
FIG. 7B is a cross-sectional view of the insulating layer shown in FIG. 6B taken along a line B2-B2.
Figure 7C:
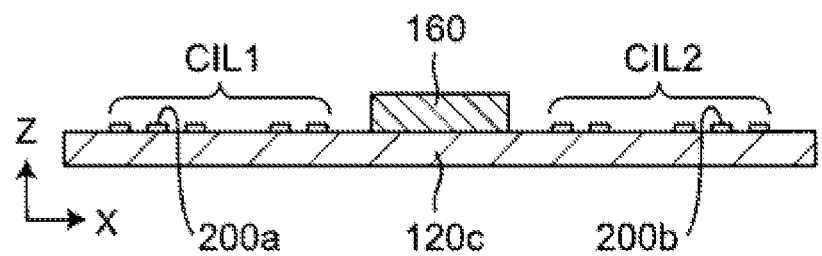
FIG. 7C is a cross-sectional view of the insulating layer shown in FIG. 6C taken along a line B3-B3.

FIG. 5 is a transverse cross-sectional view of the RFIC element shown in FIG. 4. FIG. 6A is a plan view of an upper insulating layer of a multilayer substrate 120 as viewed from directly above. FIG. 6B is a plan view of an intermediate insulating layer of the multilayer substrate 120. FIG. 6C is a plan view of a lower insulating layer of the multilayer substrate 120. FIG. 7A is a cross-sectional view of the insulating layer shown in FIG. 6A taken along a line B1-B1. FIG. 7B is a cross-sectional view of the insulating layer shown in FIG. 6B taken along a line B2-B2. FIG. 7C is a cross-sectional view of the insulating layer shown in FIG. 6C taken along a line B3-B3.

As shown in FIG. 5, an RFIC chip 160 and an impedance matching circuit 180 are built into the multilayer substrate 120. A first terminal electrode 140a and a second terminal electrode 140b are provided on one principal surface of the multilayer substrate 120. The matching circuit 180 determines the resonant frequency characteristics of an antenna while performing impedance matching between the RFIC chip 160, and the first dipole element 10 and the second dipole element 20.

The RFIC chip 160 has a structure in which various elements are built into a hard semiconductor substrate made of a semiconductor such as silicon. According to an exemplary aspect, both principal surfaces of the RFIC chip 160 are preferably square or substantially square. In addition, as shown in FIG. 6C, a first input and output terminal 160a and a second input and output terminal 160b are provided on the other principal surface of the RFIC chip 160. Inside the multilayer substrate 120, the RFIC chip 160 is located at the center in each of the X-axis, the Y-axis, and the Z-axis, in a state in which each side of the square extends along the X-axis or the Y-axis and the one principal surface and the other principal surface are parallel to the X-Y plane.

The matching circuit 180 includes a coil conductor 200 and interlayer connection conductors 240a and 240b. The coil conductor 200 includes coil patterns 200a to 200c shown in FIG. 6B or FIG. 6C. A portion of the coil pattern 200a includes a first coil portion CIL1. A portion of the coil pattern 200b includes a second coil portion CIL2. Portions of the coil pattern 200c include a third coil portion CIL3 and a fourth coil portion CIL4.

The first coil portion CIL1, the third coil portion CIL3, and the interlayer connection conductor 240a are arranged in the Z-axis direction. The second coil portion CIL2, the fourth coil portion CIL4, and the interlayer connection conductor 240b are also arranged in the Z-axis direction.

The RFIC chip 160, when the multilayer substrate 120 is viewed in the Z-axis direction, is located between the first coil portion CIL1 and the second coil portion CIL2. In addition, the RFIC chip 160, when the multilayer substrate 120 is viewed in the Y-axis direction, is located between the third coil portion CIL3 and the fourth coil portion CIL4.

Each of the first terminal electrode 140a and the second terminal electrode 140b is made of flexible copper foil and made into a strip shape. The first terminal electrode 140a and the second terminal electrode 140b have respective principal surfaces of which the sizes are identical or substantially identical to each other. The short sides of the first terminal electrode 140a and the second terminal electrode 140b extend in the X-axis direction. The long sides of the first terminal electrode 140a and the second terminal electrode 140b extend in the Y-axis direction.

Therefore, the RFIC chip 160, when the multilayer substrate 120 is viewed in the Y-axis direction, is interposed between a portion of the matching circuit 180 and another portion of the matching circuit 180. In addition, the RFIC chip 160, when the multilayer substrate 120 is viewed in the X-axis direction, overlaps with the matching circuit 180. The matching circuit 180, in the plan view of the multilayer substrate 120, partially overlaps with each of the first terminal electrode 140a and the second terminal electrode 140b.

The multilayer substrate 120, as shown in FIG. 6A to FIG. 6C, includes stacked three sheet-shaped insulating layers 120a to 120c. The insulating layer 120a is located at an upper position, the insulating layer 120b is located at an intermediate position, and the insulating layer 120c is located at a lower position.

The first terminal electrode 140a and the second terminal electrode 140b are provided on one principal surface of the insulating layer 120a. At the center position of one principal surface of the insulating layer 120b, a rectangular or substantially rectangular through hole HL1 is provided, reaching the other principal surface. The through hole HL1 has a size sufficient to include the RFIC chip 160. In addition, around the through hole HL1 on the one principal surface of the insulating layer 120b, the coil pattern 200c is provided. The coil pattern 200c is made of copper foil having flexibility.

One end portion of the coil pattern 200c, in the plan view, is disposed at a position overlapping with the first terminal electrode 140a and is connected to the first terminal electrode 140a by an interlayer connection conductor 220a extending in the Z-axis direction. In addition, the other end portion of the coil pattern 200c, in the plan view, is disposed at a position overlapping with the second terminal electrode 140b and is connected to the second terminal electrode 140b by an interlayer connection conductor 220b extending in the Z-axis direction. The interlayer connection conductors 220a and 220b are made of hard metal bulk containing Sn as a main component.

On one principal surface of the insulating layer 120c, the coil patterns 200a and 200b are provided. The coil patterns 200a and 200b are made of copper foil having flexibility.

Each of the first coil end T1 and the second coil end T2 is rectangular or substantially rectangular in the plan view of the insulating layer 120c.

The one end portion of the coil pattern 200a is connected to the one end portion of the coil pattern 200c by the interlayer connection conductor 240a extending in the Z-axis direction. The one end portion of the coil pattern 200b is connected to the other end portion of the coil pattern 200c by the interlayer connection conductor 240b extending in the Z-axis direction. The interlayer connection conductors 240a and 240b are made of hard metal bulk containing Sn as a main component.

In the plan view of the insulating layers 120b and 120c, a section of the coil pattern 200a overlaps with a section of the coil pattern 200c, and a section of the coil pattern 200b also overlaps with another section of the coil pattern 200c. Of the overlapping sections of the coil patterns 200a and 200c, the section of the coil pattern 200a is defined as a "first coil portion CIL1" and the section of the coil pattern 200c is defined as a "third coil portion CIL3." In addition, among the overlapping sections of the coil patterns 200b and 200c, the section of the coil pattern 200b is defined as a "second coil portion CIL2" and the section of the coil pattern 200c is defined as a "fourth coil portion CIL4." Further, the position of the one end portion of the coil pattern 200a or the one end portion of the coil pattern 200c is defined as a "first position P1" and the position of the one end portion of the coil pattern 200b or the other end portion of the coil pattern 200c is defined as a "second position P2."

On the one principal surface of the insulating layer 120c, rectangular or substantially rectangular dummy conductors 260a and 260b are provided. The dummy conductors 260a and 260b are made of copper foil having flexibility. In the plan view of the insulating layers 120b and 120c, the dummy conductors 260a and 260b are disposed so as to overlap with two respective corner portions among the four corner portions of the rectangular or substantially rectangular through hole HL1.

The RFIC chip 160 is mounted on the insulating layer 120c such that the four corner portions of the other principal surface respectively face the first coil end T1, the second coil end T2, and the dummy conductors 260a and 260b. The first input and output terminal 160a is disposed on the other principal surface of the RFIC chip 160 so as to overlap with the first coil end T1 in the plan view. Similarly, the second input and output terminal 160b is disposed on the other principal surface of the RFIC chip 160 so as to overlap with the second coil end T2 in the plan view.

As a result, the RFIC chip 160 is connected to the first coil end T1 by the first input and output terminal 160a and is connected to the second coil end T2 by the second input and output terminal 160b.

It is to be noted that the thickness of the insulating layers 120a to 120c is 10 μm or greater and 100 μm or less. Therefore, the RFIC chip 160 and the matching circuit 180 built into the multilayer substrate 120 are able to be seen through from the outside. Therefore, the connection state (presence of a broken wire) of the RFIC chip 160 and the matching circuit 180 is able to be easily checked.

Figure 8:
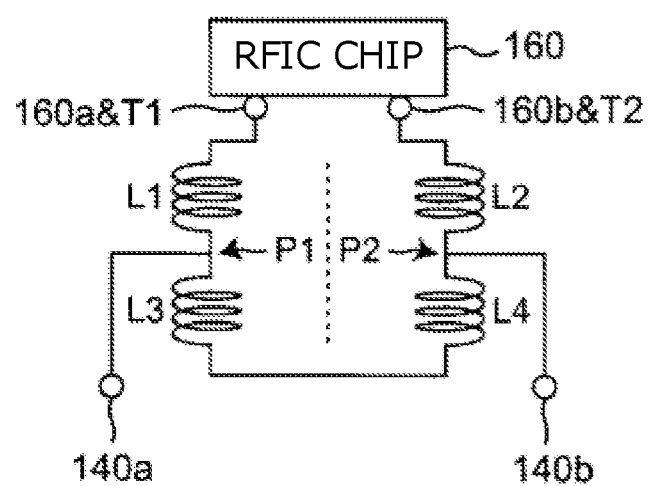
FIG. 8 is a diagram of an equivalent circuit of the RFIC element 100.

FIG. 8 is a diagram of an equivalent circuit of the RFIC element 100 configured as described above. In FIG. 8, an inductor L1 corresponds to the first coil portion CIL1. An inductor L2 corresponds to the second coil portion CIL2. An inductor L3 corresponds to the third coil portion CIL3. An inductor L4 corresponds to the fourth coil portion CIL4. The characteristics of impedance matching by the matching circuit 180 are determined by the values of the inductors L1 to L4.

One end portion of the inductor L1 is connected to the first input and output terminal 160a disposed on the RFIC chip 160. One end portion of the inductor L2 is connected to the second input and output terminal 160b disposed on the RFIC chip 160. The other end portion of the inductor L1 is connected to one end portion of the inductor L3. The other end portion of the inductor L2 is connected to one end portion of the inductor L4. The other end portion of the inductor L3 is connected to the other end portion of the inductor L4. The first terminal electrode 140a is connected to a connection point between the inductors L1 and L3. The second terminal electrode 140b is connected to a connection point between the inductors L2 and L4.

Figure 9:
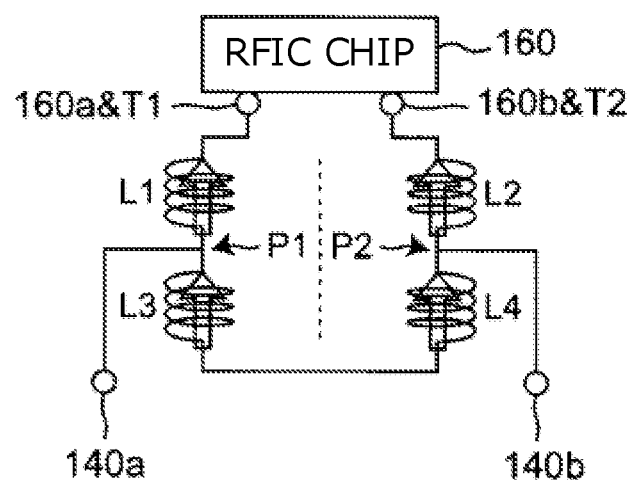
FIG. 9 is a diagram of direction of a magnetic field to be generated in inductors L1 to L4 in the RFIC element 100.

As can be seen from the equivalent circuit shown in FIG. 8, the first coil portion CIL1, the second coil portion CIL2, the third coil portion CIL3, and the fourth coil portion CIL4 are wound to provide magnetic fields in phase and are connected in series to each other. Therefore, the magnetic fields are generated toward a direction indicated by arrows in FIG. 9 at a certain time point. On the other hand, the magnetic fields are generated toward a direction opposite to the direction indicated by the arrows in FIG. 9 at another time point.

In addition, as can be seen from FIG. 6B and FIG. 6C, the first coil portion CIL1 and the third coil portion CIL3 have the same or substantially the same loop shape and the same first winding axis. Similarly, the second coil portion CIL2 and the fourth coil portion CIL4 have the same or substantially the same loop shape and the same second winding axis. The first winding axis and the second winding axis are disposed at positions in which the RFIC chip 160 is interposed between the first winding axis and the second winding axis.

In other words, the first coil portion CIL1 and the third coil portion CIL3 are magnetically and capacitively coupled. Similarly, the second coil portion CIL2 and the fourth coil portion CIL4 are magnetically and capacitively coupled.

As can be understood from the description, the RFIC chip 160 includes the first input and output terminal 160a and the second input and output terminal 160b and is built into the multilayer substrate 120. In addition, the matching circuit 180 includes the coil patterns 200a to 200c and is built into the multilayer substrate 120. Of the coil patterns 200a to 200c, the coil pattern 200a has the other end portion (=the first coil end T1) connected to the first input and output terminal 160a, and the coil pattern 200b has the other end portion (=the second coil end T2) connected to the second input and output terminal 160b. In addition, the first terminal electrode 140a and the second terminal electrode 140b are disposed on the one principal surface of the multilayer substrate 120. The first terminal electrode 140a is connected to the one end portion (=the first position P1) of the coil pattern 200a. The second terminal electrode 140b is connected to the one end portion (=the second position P2) of the coil pattern 200b.

In addition, the first coil portion CIL1 is present in a section from the first coil end T1 to the first position P1 and has the first winding axis in the direction intersecting with the one principal surface of the multilayer substrate 120. The second coil portion CIL2 is present in a section from the second coil end T2 to the second position P2 and has the second winding axis in the direction intersecting with the one principal surface of the multilayer substrate 120. The third coil portion CIL3 is disposed so as to overlap with the first coil portion CIL1 in the plan view. The fourth coil portion CIL4 is disposed so as to overlap with the second coil portion CIL2 in the plan view. The first coil portion CIL1 and the third coil portion CIL3, and the second coil portion CIL2 and the fourth coil portion CIL4 are disposed at positions in which the RFIC chip 160 is interposed between first coil portion CIL1 and the third coil portion CIL3, and the second coil portion CIL2 and the fourth coil portion CIL4. The matching circuit 180 and the RFIC chip 160 are built into the multilayer substrate 120.

The RFIC chip 160 includes the semiconductor substrate. Therefore, the RFIC chip 160 acts as a ground or a shield for the first coil portion CIL1, the second coil portion CIL2, the third coil portion CIL3, and the fourth coil portion CIL4. As a result, the first coil portion CIL1 and the second coil portion CIL2 as well as the third coil portion CIL3 and the fourth coil portion CIL4 are hardly magnetically or capacitively coupled to each other. Accordingly, the risk of narrowing the passband of a communication signal is significantly reduced or prevented.

Figure 10:
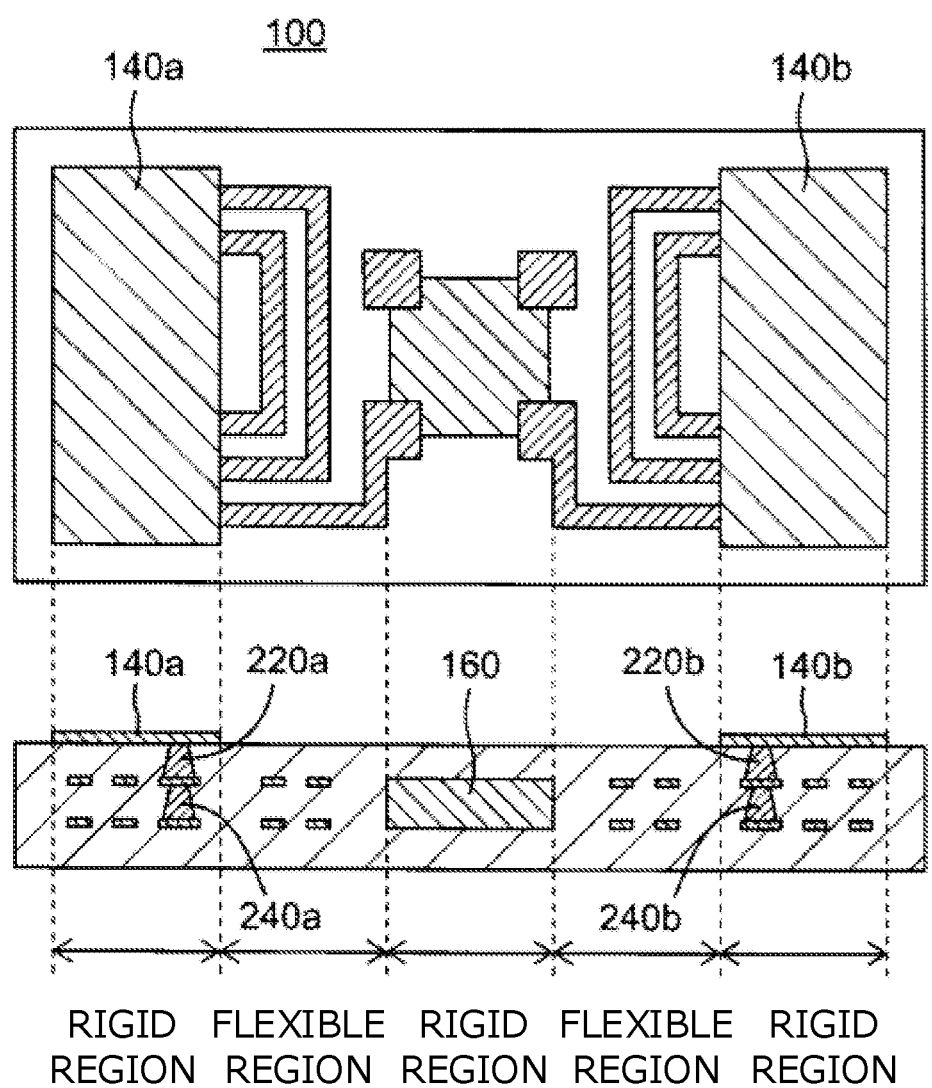
FIG. 10 is a diagram of distribution of a rigid region and a flexible region in the RFIC element 100.
Figure 11:
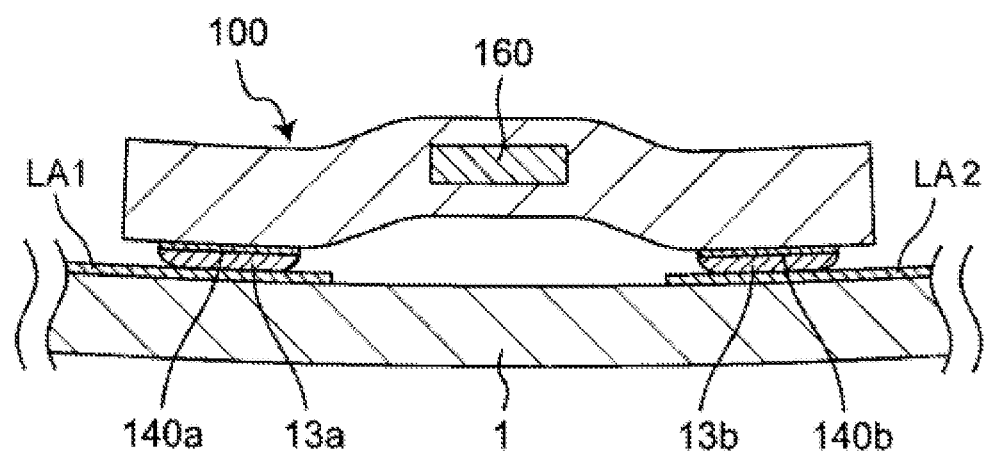
FIG. 11 is a diagram of a bent state of an RFID tag including the RFIC element 100 attached to lands LA1 and LA2.

Subsequently, a description will be made of an example in which the RFIC element 100 is attached onto the lands LA1 and LA2 by conductive bonding materials 13a and 13b such as solder. FIG. 10 is a diagram of distribution of a rigid region and a flexible region in the RFIC element 100. FIG. 11 is a diagram of a bent state of an RFID tag having the RFIC element 100 attached to the lands LA1 and LA2.

As described above, the multilayer substrate 120, the coil patterns 200a to 200c, the first terminal electrode 140a, and the second terminal electrode 140b include members having flexibility. On the other hand, the interlayer connection conductors 220a, 220b, 240a, and 240b and the RFIC chip 160 include hard members. In addition, the first terminal electrode 140a and the second terminal electrode 140b are comparatively large in size and therefore less flexible. In addition, in a case in which a plating film of Ni/Au or Ni/Sn, or the like is applied to the first terminal electrode 140a and the second terminal electrode 140b, the first terminal electrode 140a and the second terminal electrode 140b are further reduced in flexibility.

As a result, the RFIC element 100, as shown in FIG. 10, includes rigid regions and flexible regions. More specifically, the regions in which the first terminal electrode 140a, the second terminal electrode 140b, and the RFIC chip 160 are disposed are defined as the rigid regions, and the other regions are defined as the flexible regions. In particular, since the first terminal electrode 140a and the second terminal electrode 140b are disposed at positions away from the RFIC chip 160, regions between the first terminal electrode 140a and the RFIC chip 160 and between the second terminal electrode 140b and the RFIC chip 160 are the flexible regions.

Therefore, in a case in which the RFID tag having the RFIC element 100 attached to the lands LA1 and LA2 of the base material 1 is attached to a curved surface, the RFIC element 100 is bent as shown in FIG. 11, for example.

Figure 12:
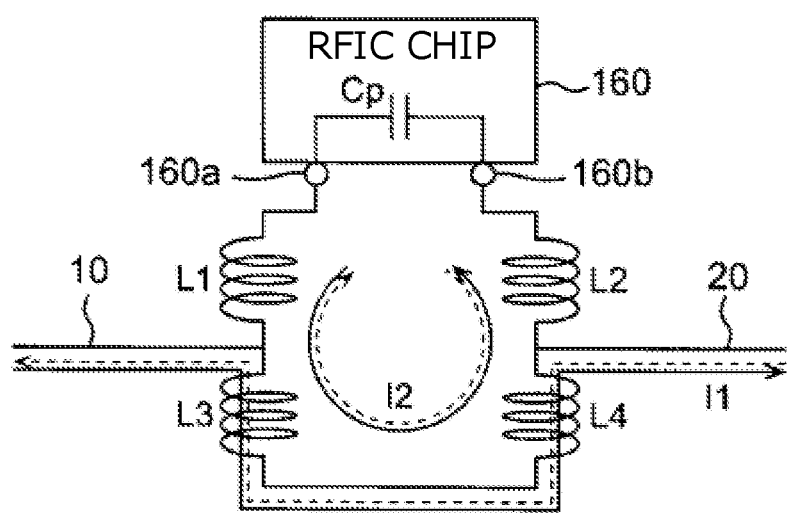
FIG. 12 is a diagram of an example in which a current flows through an equivalent circuit of the RFID tag of FIG. 11.
Figure 13:
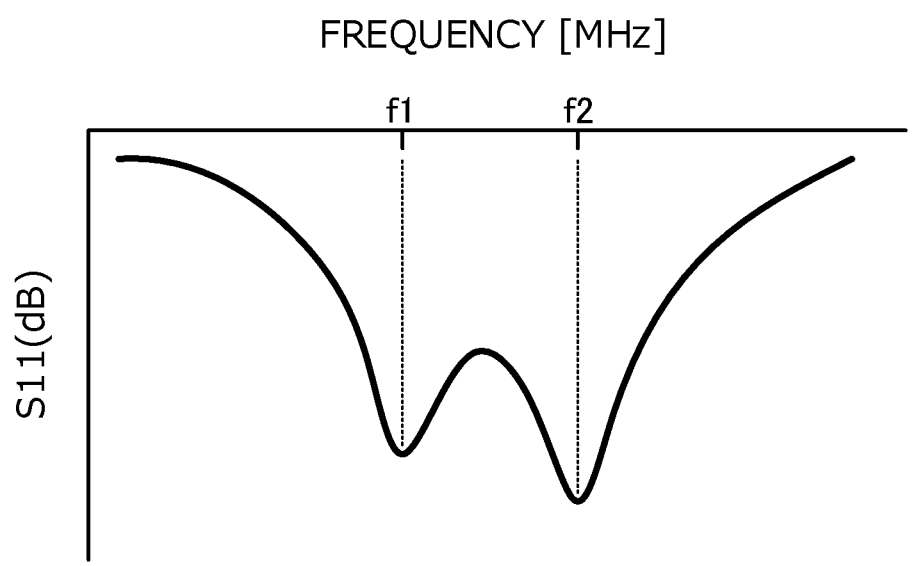
FIG. 13 is a diagram illustrating a frequency characteristic of return loss when a circuit to be connected to an RFIC chip is viewed from the RFIC chip, in the RFID tag of FIG. 11.

FIG. 12 is a diagram of an example in which a current flows through an equivalent circuit of the RFID tag of FIG. 11. FIG. 13 is a diagram illustrating a frequency characteristic of return loss when a circuit to be connected to an RFIC chip is viewed from the RFIC chip, in the RFID tag of FIG. 11.

As shown in FIG. 12, the RFIC chip 160 has a parasitic capacitance (a stray capacitance) Cp present between the first input and output terminal 160a and the second input and output terminal 160b. Therefore, two resonances are generated in the RFIC element 100. The first resonance is the resonance generated in a current path including the first dipole element 10, the second dipole element 20, and the inductors L3 and L4. The second resonance is the resonance generated in a current path (a current loop) including the inductors L1 to L4 and the parasitic capacitance Cp. These two resonances are coupled by the inductors L3 to L4 shared by the current paths. Two respective currents I1 and I2 corresponding to the two resonances flow as indicated by an arrow with broken line in FIG. 12.

In addition, both a first resonance frequency and a second resonance frequency are affected by the inductors L3 to L4. As a result, as shown in FIG. 13, a difference of several dozen MHz (specifically, about 5 MHz or greater to about 50 MHz or less, for example) is generated between the first resonance frequency f1 and the second resonance frequency f2. By combining the two resonances in this manner, broadband resonance frequency characteristics as shown in FIG. 13 are obtained.

According to various exemplary embodiments described herein, since the RFIC element 100 includes an impedance matching circuit that matches impedance between the RFIC chip 160, and the first dipole element 10 and the second dipole element 20 and determines the resonant frequency characteristics of an antenna, the following operational effects are able to be obtained.

To begin with, it is unnecessary to provide a base material with a circuit for performing impedance matching and setting resonant frequency characteristics, so that the area of the base material is able to be effectively used as a space for providing a dipole element and the size of an RFID tag is able to be reduced. In addition, when the size is the same, the higher gain is able to be achieved.

In addition, since the lands LA1 and LA2 on which the RFIC element 100 is mounted, in the plan view, overlap with the first coil portion CIL1, the second coil portion CIL2, the third coil portion CIL3, and the fourth coil portion CIL4 of the RFIC element 100, the coil portions CIL1 to CIL4 are electromagnetically shielded by the lands LA1 and LA2. Accordingly, the RFID tag is hardly affected by the electromagnetic characteristics of an article to which the RFID tag is to be attached. In other words, even in a case in which the RFID tag 301 is attached to an article having a high relative dielectric constant and a high relative permeability, the electromagnetic characteristics of the RFID tag are hardly changed between the state of being attached to the article and the state of being the tag alone before being attached.

Second Exemplary Embodiment

In a second exemplary embodiment, a description will be made of an RFID tag that is different in the shape of the dipole antenna from the RFID tag according to the first exemplary embodiment.

Figure 14:
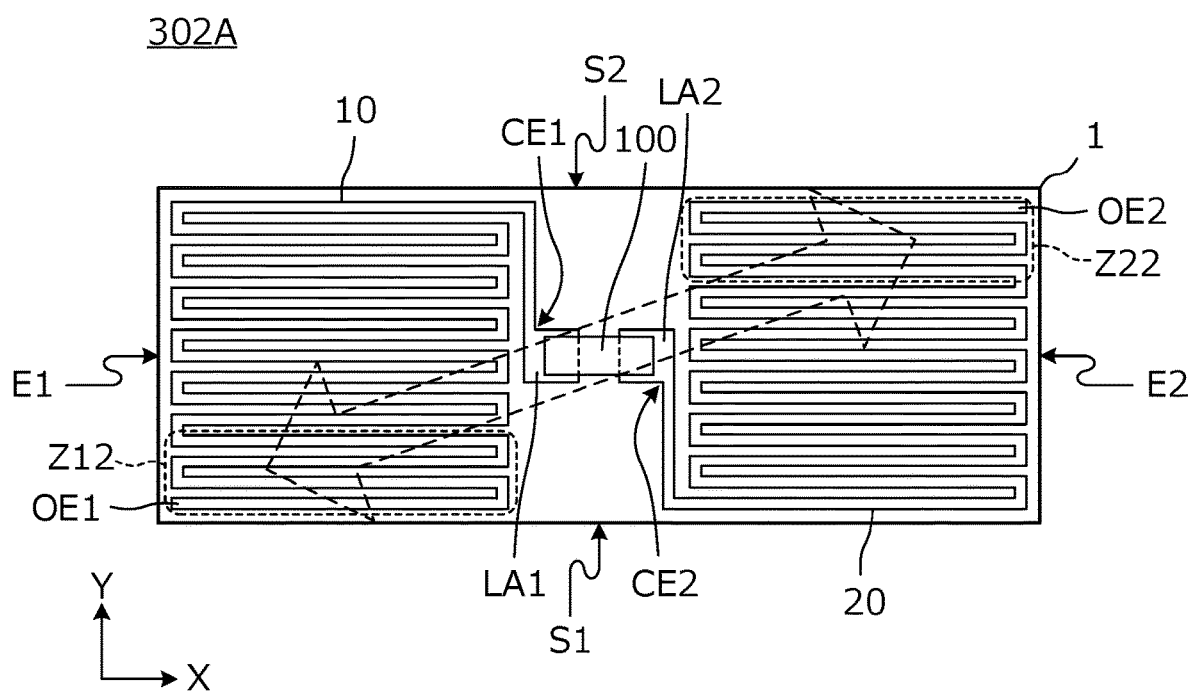
FIG. 14 is a plan view of an RFID tag 302A according to a second exemplary embodiment.

FIG. 14 is a plan view of an RFID tag 302A according to the second exemplary embodiment. The RFID tag 302A of the second exemplary embodiment includes a rectangular plate-shaped base material 1, a first dipole element 10 and a second dipole element 20 that are provided on the base material 1, and an RFIC element 100 mounted on the base material 1.

The base material 1 includes the first dipole element 10 and the second dipole element 20. The first dipole element 10 and the second dipole element 20 constitute one dipole antenna.

One end of the first dipole element 10 is a first connection end CE1 to be connected (connected to the first input and output terminal of the RFIC element) to the land LA1. The other end of the first dipole element 10 is a first open end OE1. One end of the second dipole element 20 is a second connection end CE2 to be connected (connected to the second input and output terminal of the RFIC element) to the land LA2. The other end of the second dipole element 20 is a second open end OE2.

The first dipole element 10 is a conductor pattern that extends from the first connection end CE1 toward the first end portion E1 and meanders toward the first side portion S1. Similarly, the second dipole element 20 is a conductor pattern that extends from the second connection end CE2 toward the second end portion E2 and meanders toward the second side portion S2.

The first open end OE1 may be located at a position adjacent to the first side portion S1 in a region in which the first dipole element 10 is provided. Similarly, the second open end OE2 may be located at a position adjacent to the second side portion S2 in a region in which the second dipole element 20 is provided.

The first open end OE1 of the first dipole element 10 may be located in the vicinity of the first end portion E1 of the base material 1. Similarly, the second open end OE2 of the second dipole element 20 may be located in the vicinity of the second end portion E2 of the base material 1.

The RFID tag 302A of the second exemplary embodiment is different in the positions of the first open end OE1 and the second open end OE2 from the RFID tag 301 illustrated in FIG. 1A. In addition, the RFID tag 302A is different from the RFID tag 301 illustrated in FIG. 1A in that the RFID tag 302A does not include the tip portions 12 and 22.

In the second exemplary embodiment, a range from the first open end OE1 of the first dipole element 10 to a position at which the conductor pattern is followed and returned by a constant amount from the first open end OE1 toward the first connection end CE1 is indicated by a tip region Z12. Similarly, a range from the second open end OE2 of the second dipole element 20 to a position at which the conductor pattern is followed and returned by a constant amount from the second open end OE2 toward the second connection end CE2 is indicated by a tip region Z22.

In FIG. 14, the voltage strength distribution of the tip region Z12 of the entire first dipole element 10 is relatively large. Similarly, the voltage strength distribution of the tip region Z22 of the entire second dipole element 20 is relatively large. Therefore, the line that connects the center of gravity of the voltage distribution in the first dipole element 10 and the center of gravity of the voltage distribution in the second dipole element 20 is inclined from the X axis. The thick arrow shown in FIG. 14 represents a null point. As described above, a null point is inclined from the X-axis.

The boundary between the tip regions Z12 and Z22 and a region outside the tip regions is not a boundary with critical significance. The above-described tip regions Z12 and Z22 are represented for the sake of convenience of description. In other words, a "constant amount" by which the conductor pattern is followed and returned from the first open end OE1 of the first dipole element 10 toward the first connection end CE1, and a "constant amount" by which the conductor pattern is followed and returned from the second open end OE2 of the second dipole element 20 toward the second connection end CE2 are introduced for convenience. Even when this "constant amount" is changed, the description of such effect that the above-described null point is inclined from the X axis holds true.

Figure 15:
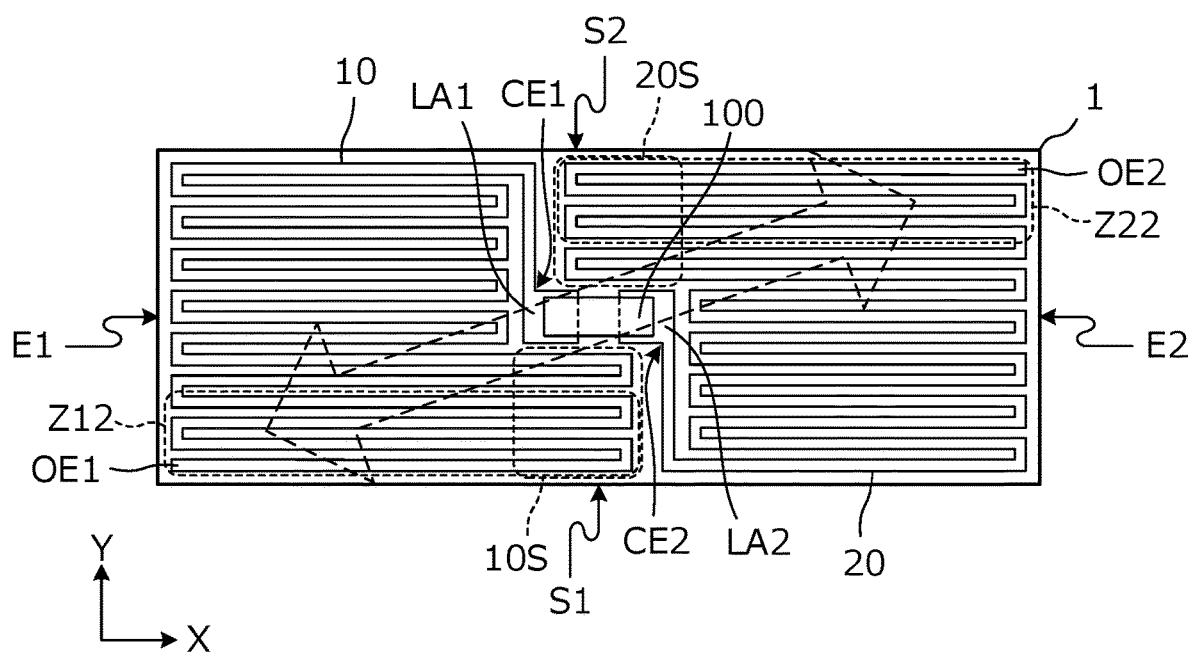
FIG. 15 is a plan view of another RFID tag 302B according to the second exemplary embodiment.

FIG. 15 is a plan view of another RFID tag 302B according to the second exemplary embodiment. The RFID tag 302B includes a side conductor pattern 10S disposed between the RFIC element 100 and the first side portion S1, the side conductor pattern 10S being a portion of the first dipole element 10, and a side conductor pattern 20S disposed between the RFIC element 100 and the second side portion S2, the side conductor pattern 20S being a portion of the second dipole element 20. Other configurations are the same as the configurations of the RFID tag 302A illustrated in FIG. 14.

In the example of FIG. 15, since the side conductor patterns 10S and 20S are provided, compared to the example illustrated in FIG. 14, the line that connects the center of gravity of the voltage distribution in the first dipole element 10 and the center of gravity of the voltage distribution in the second dipole element 20 is more effectively inclined from the X-axis.

According to the second exemplary embodiment, since a conductor pattern that has the effect of adding capacitance is not provided in the tip portion of the dipole element of the RFID tag, the RFID tag is hardly affected by the electromagnetic characteristics of an article to which the RFID tag is to be attached. In other words, even in a case in which the RFID tag 301 is attached to an article having a high relative dielectric constant, between the state of being attached to the article and the state of being the tag alone before being attached, the capacitance to be added to the tip portion of the dipole element is hardly changed, and the electromagnetic characteristics of the RFID tag are also hardly changed.

Third Exemplary Embodiment

In a third exemplary embodiment, a description will be made of an RFID tag that is different in the shape of the dipole antenna from the RFID tag according to the first and second exemplary embodiments.

Figure 16:
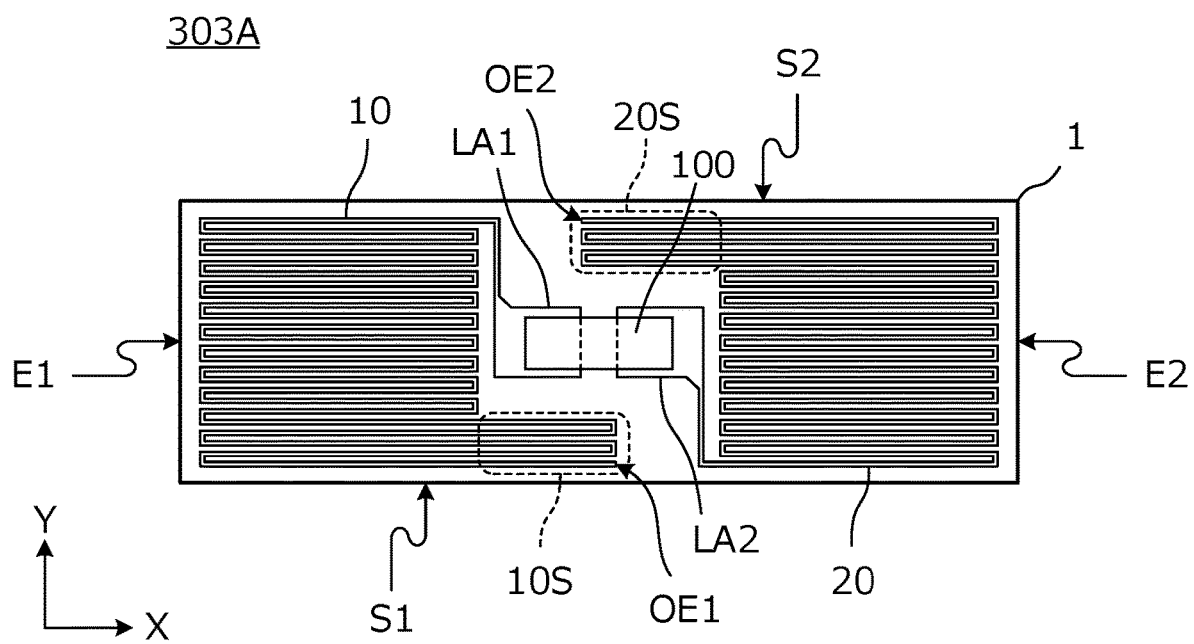
FIG. 16 is a plan view of an RFID tag 303A according to a third exemplary embodiment.

FIG. 16 is a plan view of an RFID tag 303A according to the third exemplary embodiment. The RFID tag 303A of the third exemplary embodiment includes a rectangular plate-shaped base material 1, a first dipole element 10 and a second dipole element 20 that are provided on the base material 1, and an RFIC element 100 mounted on the base material 1.

The first open end OE1 of the first dipole element 10 is not at a position adjacent to the first end portion E1, but is at a position closer to the center than the first end portion E1 and the second end portion E2. Similarly, the second open end OE2 of the second dipole element 20 is not at a position adjacent to the second end portion E2, but is at a position closer to the center than the first end portion E1 and the second end portion E2.

In addition, the side conductor pattern 10S of the first dipole element 10 is provided to extend to a position closer to the second end portion E2 than an intermediate point between the land LA1 and the land LA2. Similarly, the side conductor pattern 20S of the second dipole element 20 is provided to extend to a position closer to the first end portion E1 than an intermediate point between the land LA1 and the land LA2.

Other configurations are the same as the configurations of the RFID tag 302B illustrated in FIG. 15.

Figure 17:
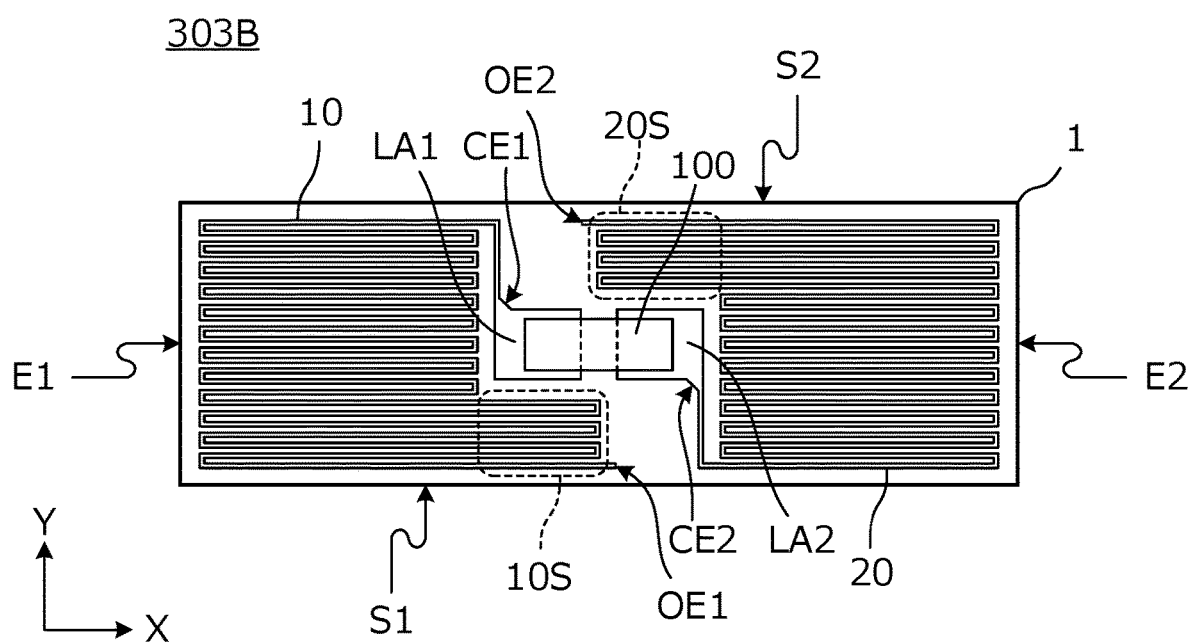
FIG. 17 is a plan view of another RFID tag 303B according to the third exemplary embodiment.

FIG. 17 is a plan view of another RFID tag 303B according to the third exemplary embodiment. The first open end OE1 of the first dipole element 10 projects from the main portion of the side conductor pattern 10S. Similarly, the second open end OE2 of the second dipole element 20 projects from the main portion of the side conductor pattern 20S. Other configurations are the same as the configurations of the RFID tag 303A illustrated in FIG. 16.

According to the third exemplary embodiment, since the first open end OE1 of the first dipole element 10 is located along the first side portion S1 and located at a position (an inside position) away from the first end portion E1, and the second open end OE2 of the second dipole element 20 is also located along the second side portion S2 and away (inside) from the second end portion E2, the line that connects the center of gravity of the voltage distribution in the first dipole element 10 and the center of gravity of the voltage distribution in the second dipole element 20 is effectively inclined from the X-axis.

Although the resonant frequency of a dipole antenna is able to be determined by the length of the side conductor pattern 10S and the side conductor pattern 20S, as illustrated in FIG. 17 in particular, when only the amount by which the open ends OE1 and OE2 project is changed, the resonant frequency is able to be independently determined without changing directivity.

Fourth Exemplary Embodiment

In a fourth exemplary embodiment, a description will be made of an RFID tag that is different in the shape of the dipole antenna from the RFID tag that has been illustrated in the previous exemplary embodiments.

Figure 18:
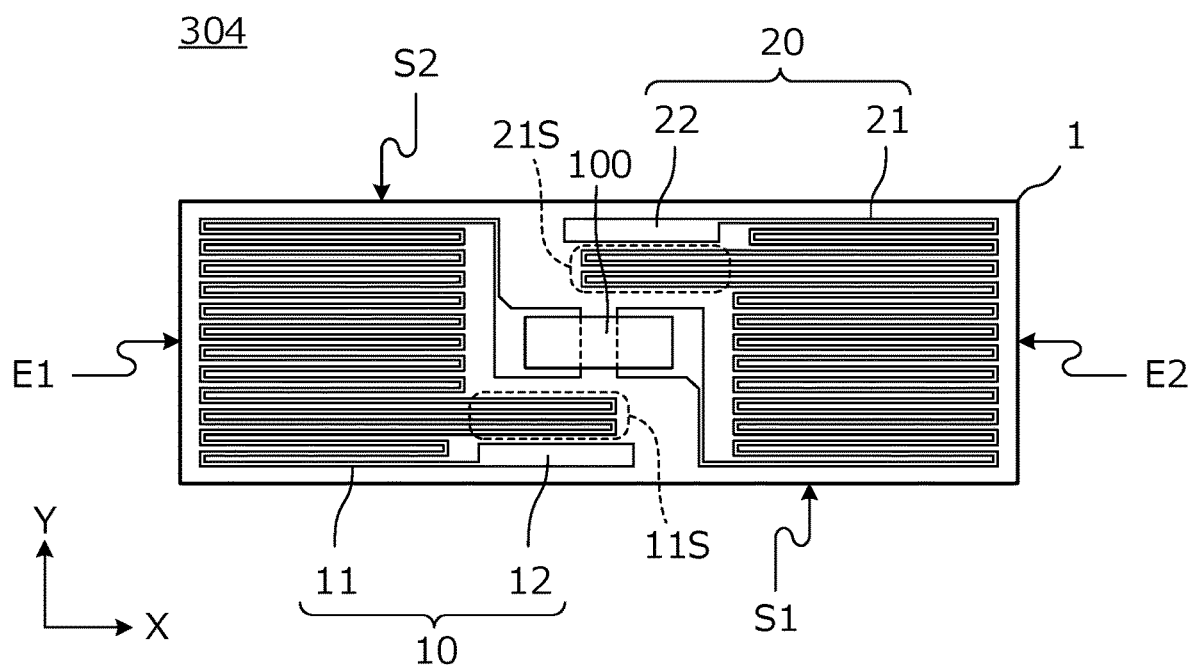
FIG. 18 is a plan view of an RFID tag 304 according to a fourth exemplary embodiment.

FIG. 18 is a plan view of an RFID tag 304 according to the fourth exemplary embodiment. The RFID tag 304 of the fourth exemplary embodiment includes a rectangular plate-shaped base material 1, a first dipole element 10 and a second dipole element 20 that are provided on the base material 1, and an RFIC element 100 mounted on the base material 1.

The first dipole element 10 includes a main conductor pattern portion 11 and a tip portion 12. The second dipole element 20 includes a main conductor pattern portion 21 and a tip portion 22.

The main conductor pattern portion 11 of the first dipole element 10 includes a side conductor pattern 11S. This side conductor pattern 11S is disposed between the RFIC element 100 and the tip portion 12. Similarly, the main conductor pattern portion 21 of the second dipole element 20 includes a side conductor pattern 21S disposed between the RFIC element 100 and the tip portion 22.

As in the fourth exemplary embodiment, one end of the tip portion 12 may not be located in the vicinity of the first end portion E1 and may be mainly provided between the RFIC element 100 and the first side portion S1. Similarly, one end of the tip portion 22 may not be located in the vicinity of the second end portion E2 and may be mainly provided between the RFIC element 100 and the second side portion S2.

According to the fourth exemplary embodiment, since the tip portion 12 is located along the first side portion S1 and away from the first end portion E1, and the tip portion 22 is located along the second side portion S2 and away from the second end portion E2, even when the tip portions 12 and 22 have a comparatively small area, the line that connects the center of gravity of the voltage distribution of the first dipole element 10 and the center of gravity of the voltage distribution of the second dipole element 20 is able to be effectively inclined from the X-axis.

While each of the above described exemplary embodiments shows, as an example, the RFID tag including the rectangular-shaped base material 1 in the plan view, the base material 1 may have rounded corners. In addition, the plan view shape of the base material 1 may be elliptical or oval. In addition, each of the first end portion E1, the second end portion E2, the first side portion S1, and the second side portion S2 may entirely be a curve.

In addition, while each of the above described exemplary embodiments shows, as an example, the RFID tag including the RFIC element 100 obtained by integrating the RFIC chip 160 and the impedance matching circuit that matches impedance between the RFIC chip 160 and the dipole antenna, the impedance matching circuit may be provided on the base material.

In addition, while the dipole antenna illustrated in each of the above described exemplary embodiments is a dipole antenna in which the electric length of each dipole element is equivalent to a quarter wavelength and the electric length from the first open end to the second open end is equivalent to a half wavelength, the electric length from the first open end to the second open end may be less than a half wavelength, or the dipole antenna may be an asymmetrical dipole antenna in which the electric length of the first dipole element is different from the electric length of the second dipole element.

In addition, while the RFID tag illustrated in each of the above described exemplary embodiments includes the dipole antenna provided on substantially the entire area of the base material, the dipole antenna may be provided on a portion of the base material. In addition, the outline of the base material may not be similar in shape to the region in which the dipole antenna is provided.

In addition, the management of an article by an RFID tag is not limited to management of an electric appliance, an electronic device, and accessories of the electric appliance and the electronic device. In addition, the "housing" in the exemplary RFID tag management method is not limited to a housing of an electric appliance or an electronic device, and means a storage that stores an article to be managed.

Finally, the foregoing exemplary embodiments are illustrative in all points and should not be construed to limit the present invention. It is to be understood that variations and modifications will be apparent to those skilled in the art without departing from the scope and spirit of the present invention. The scope of the present invention is defined not by the foregoing exemplary embodiment but by the following claims. Further, the scope of the present invention is intended to include all possible changes and modifications from the exemplary embodiments within the scopes of the claims and the scopes of equivalents.

REFERENCE SIGNS LIST

CE1—First connection end
CE2—Second connection end
CIL1—First coil portion
CIL2—Second coil portion
CIL3—Third coil portion
CIL4—Fourth coil portion
Cp—Stray capacitance
E1—First end portion
E2—Second end portion
HL1—Through hole
L1, L2, L3, L4—Inductor
LA1, LA2—Land
OE1—First open end
OE2—Second open end
P1—First position
P2—Second position
S1—First side portion
S2—Second side portion
T1—First coil end
T2—Second coil end
Z12—Tip region of the first dipole element 10
Z22—Tip region of the second dipole element 20
ZE1—Region in which the first dipole element 10 is provided, from the first connection end CE1 to the first end portion E1
ZE2—Region in which the second dipole element 20 is provided, from the second connection end CE2 to the second end portion E2
Z12—Tip region including a range from the first open end OE1 of the first dipole element 10 to a position at which the conductor pattern is followed and returned by a constant amount toward the first connection end CE1
Z22—Tip region including a range from the second open end OE2 of the second dipole element 20 to a position at which the conductor pattern is followed and returned by a constant amount toward the second connection end CE2
1—Base material
10—First dipole element
10S, 20S—Side conductor pattern
11, 21—Main conductor pattern portion
11S, 21S—Side conductor pattern
12, 22—Tip portion
13a, 13b—Conductive bonding material
20—Second dipole element
100—RFIC element
120—Multilayer substrate
120a, 120b, 120c—Insulating layer
140a—First terminal electrode
140b—Second terminal electrode
160—RFIC chip
160a—First input and output terminal
160b—Second input and output terminal
180—Matching circuit
200—Coil conductor
200a, 200b, 200c—Coil pattern
220a, 220b—Interlayer connection conductor
240a, 240b—Interlayer connection conductor
260a, 260b—Dummy conductor
301, 301A, 302A, 302B, 303A, 303B, 304—RFID tag
401A to 401E—Article

The invention claimed is:
1. An RFID tag comprising:
a base material;
an RFIC element mounted on the base material and including a first input and output terminal and a second input and output terminal; and
a dipole antenna disposed on the base material and including:
a first dipole element including a first connection end connected to the first input and output terminal, and a first open end; and
a second dipole element including a second connection end connected to the second input and output terminal, and a second open end,
wherein the dipole antenna is disposed in a region extending in a longitudinal direction and a transverse direction in a plan view of the base material,
wherein the region includes a first and second opposing ends that face each other in the longitudinal direction, and a first and second opposing sides that face each other in the transverse direction,
wherein the first dipole element is a conductor pattern that extends from the first connection end towards the first end of the region and meanders toward the first side of the region, and
wherein the second dipole element is a conductor pattern that extends from the second connection end towards the second end of the region and meanders toward the second side of the region.
2. The RFID tag according to claim 1,
wherein the first open end is disposed at a position adjacent to the first side of the region where the first dipole element is disposed; and
wherein the second open end is disposed at a position adjacent to the second side of the region where the second dipole element is disposed.
3. The RFID tag according to claim 2,
wherein the first open end of the first dipole element is bent back from the first end toward the second end; and wherein the second open end of the second dipole element is bent back from the second end toward the first end.

4. The RFID tag according to claim 1, wherein the RFIC element comprises an element in which an RFIC chip and an impedance matching circuit are integrated, and wherein the impedance matching circuit matches impedance between the RFIC chip and the dipole antenna.

5. The RFID tag according to claim 1, wherein the RFIC element is disposed at a center of the region in which the dipole antenna is disposed.

6. The RFID tag according to claim 5,
wherein the first dipole element comprises a portion disposed between the RFIC element and the first side of the region; and
wherein the second dipole element comprises a portion disposed between the RFIC element and the second side of the region.

7. The RFID tag according to claim 1, wherein the dipole antenna has a length in the longitudinal direction that is more than twice a length in the transverse direction.

8. The RFID tag according to claim 1, wherein the RFIC element is configured to communicate in a UHF band through the dipole antenna.

9. An RFID tag management method for managing by an RFID tag an article housed in a housing at which a communication direction in which a reader/writer is directed is one way, the method comprising:
attaching the RFID tag to an outer surface of the article, the outer surface configured to be attached with the RFID tag and being away from a metal member in the housing, the RFID tag including:
a base material;
an RFIC element mounted on the base material and including a first input and output terminal and a second input and output terminal; and
a dipole antenna disposed on the base material and including:
a first dipole element including a first connection end connected to the first input and output terminal, and a first open end; and
a second dipole element including a second connection end connected to the second input and output terminal, and a second open end,
wherein the dipole antenna is disposed in a region extending in a longitudinal direction and a transverse direction in a plan view of the base material,
wherein the region includes a first and second opposing ends that face each other in the longitudinal direction, and a first and second opposing sides that face each other in the transverse direction,
wherein the first dipole element is a conductor pattern that extends from the first connection end towards the first end of the region and meanders toward the first side of the region, and
wherein the second dipole element is a conductor pattern that extends from the second connection end towards the second end of the region and meanders toward the second side of the region; and
directing the reader/writer in the communication direction to communicate with the RFID tag.

10. The RFID tag according to claim 1,
wherein the first dipole element comprises a first main conductor pattern that meanders back and forth from the first connection end towards the first end of the region and a first tip portion forming the first open end and extending adjacent to and in a direction parallel to the first side of the region, and wherein the second dipole element comprises a second main conductor pattern that meanders back and forth from the second connection end towards the second end of the region and a second tip portion forming the second open end and extending adjacent to and in a direction parallel to the second side of the region.

11. The RFID tag according to claim 10,
wherein the first tip portion comprises a line width extending in the transverse direction that is more than twice a line width of the first main conductor pattern, and
wherein the second tip portion comprises a line width extending in the transverse direction that is more than twice a line width of the second main conductor pattern.

12. The RFID tag according to claim 10,
wherein the first tip portion extends towards the second end of the region and past the first connection end in the longitudinal direction, and
wherein the second tip portion extends towards the first end of the region and past the second connection end in the longitudinal direction.

13. An RFID tag comprising:
a base comprises a rectangular region with a pair of opposing first and second long sides and a pair of opposing first and second short sides;
an RFIC element disposed on the base and including a first input and output terminal and a second input and output terminal;
a first dipole element disposed on the base and including a first connection end connected to the first input and output terminal and a first open end, the first dipole element including a conductor pattern that extends from the first connection end towards the first short side of the base and meanders toward the first long side of the base; and
a second dipole element disposed on the base and including a second connection end connected to the second input and output terminal and a second open end, the second dipole element including a conductor pattern that extends from the second connection end towards the second short side of the base and meanders toward the second long side of the base.

14. The RFID tag according to claim 13,
wherein the first dipole element comprises a first tip forming the first open end that is disposed at a position adjacent to the first long side of the base; and
wherein the second dipole element comprises a second tip forming the second open end that is disposed at a position adjacent to the second long side of the base.

15. The RFID tag according to claim 13,
wherein the first open end of the first dipole element is bent back from the first short side of the base towards the second short side of the base; and
wherein the second open end of the second dipole element is bent back from the second short side of the base towards the first short side of the base.

16. The RFID tag according to claim 13, wherein the RFIC element comprises an element in which an RFIC chip and an impedance matching circuit are integrated, and wherein the impedance matching circuit matches impedance between the RFIC chip and a dipole antenna formed by the first and second dipole elements.

17. The RFID tag according to claim 13,
wherein the RFIC element is disposed at a center of the base, wherein the first dipole element comprises a portion disposed between the RFIC element and the first long side of the base; and wherein the second dipole element comprises a portion disposed between the RFIC element and the second long side of the base.

18. The RFID tag according to claim 13, wherein the RFIC element is configured to communicate in a UHF band through a dipole antenna formed by the first and second dipole elements.

19. The RFID tag according to claim 13, wherein the first dipole element comprises a first main conductor pattern that meanders back and forth from the first connection end towards the first short side of the base and a first tip portion extending adjacent to and in a direction parallel to the first long side of the base, and wherein the second dipole element comprises a second main conductor pattern that meanders back and forth from the second connection end towards the second short side of the base and a second tip portion extending adjacent to and in a direction parallel to the second long side of the base.

20. The RFID tag according to claim 19, wherein the first tip portion extends towards the second short side of the base and past the first connection end in a longitudinal direction of the base extending from the first short side to the second short side, and wherein the second tip portion extends towards the first short side of the base and past the second connection end in the longitudinal direction.

* * * * *